US012649132B2

(12) United States Patent
Saranow et al.

(10) Patent No.: US 12,649,132 B2
(45) Date of Patent: Jun. 9, 2026

(54) BLENDING STATION APPARATUS AND METHOD FOR USING THE SAME

(71) Applicant: B&R Holdings, LLC, Chicago, IL (US)

(72) Inventors: Mitchell H. Saranow, Winnetka, IL (US); Charles C. Mayberry, Harvard, IL (US)

(73) Assignee: B&R Holdings, LLC, Chicago, IL (US)

( * ) Notice: Subject to any disclaimer, the term of this patent is extended or adjusted under 35 U.S.C. 154(b) by 0 days.

(21) Appl. No.: 18/593,704

(22) Filed: Mar. 1, 2024

(65) Prior Publication Data

US 2024/0198305 A1 Jun. 20, 2024

Related U.S. Application Data

(63) Continuation of application No. 17/581,718, filed on Jan. 21, 2022, now Pat. No. 11,918,964, which is a
(Continued)

(51) Int. Cl.
*B01F 33/84* (2022.01)
*A45D 19/00* (2006.01)
(Continued)

(52) U.S. Cl.
CPC .......... *B01F 33/8442* (2022.01); *A45D 19/00* (2013.01); *A45D 44/005* (2013.01);
(Continued)

(58) Field of Classification Search
CPC .... B01F 33/8442; B01F 33/84; B01F 33/848; B01F 35/2117; B01F 2101/21; A45D 44/005
See application file for complete search history.

(56) References Cited

U.S. PATENT DOCUMENTS 3,122,272 A 2/1964 Marsh
3,416,517 A 12/1968 Adams et al.
(Continued)

FOREIGN PATENT DOCUMENTS

DE 203 07 083 U1 9/2003
DE 10 2005 031 269 B3 12/2006
(Continued)

OTHER PUBLICATIONS

Berns, *Billmeyer and Salzman's Principles of Color Technology*, Fourth Edition, Chapter 9, "Optical Modeling of Colored Materials," pp. 169-188, John Wiley & Sons, Inc., 2019. (20 pages).

*Primary Examiner* — Jason K Niesz
(74) *Attorney, Agent, or Firm* — Seed Intellectual Property Law Group LLP

(57) ABSTRACT

A system for recalculating a formula previously used in preparing a mixture made from adding at least two components. The system includes a control system and salon management software. The control system has a processor, a computer-readable memory, and a display. The memory contains software configured to receive a formula defining instructions for blending a hair dye mixture using one or more blending materials and amounts recommended for the hair dye mixture. The salon management software is stored in the computer-readable memory and executed by the control system. The salon management software is in communication with the control system to exchange information on customers and formulas of hair dye mixtures associated with the customers.

17 Claims, 15 Drawing Sheets

Related U.S. Application Data continuation of application No. 16/529,604, filed on Aug. 1, 2019, now Pat. No. 11,235,298, which is a continuation of application No. 15/912,109, filed on Mar. 5, 2018, now Pat. No. 11,052,359, which is a continuation of application No. 15/463,482, filed on Mar. 20, 2017, now Pat. No. 9,919,278, which is a continuation of application No. 13/893,155, filed on May 13, 2013, now Pat. No. 9,623,388, which is a continuation of application No. 12/986,448, filed on Jan. 7, 2011, now Pat. No. 8,567,455, which is a continuation-in-part of application No. 12/849,427, filed on Aug. 3, 2010, now Pat. No. 8,393,363, which is a continuation-in-part of application No. 12/396, 050, filed on Mar. 2, 2009, now Pat. No. 7,963,303.

(60) Provisional application No. 61/115,960, filed on Nov. 19, 2008, provisional application No. 61/033,053, filed on Mar. 3, 2008.

(51) Int. Cl.
| | |
|---|---|
| *A45D 44/00* | (2006.01) |
| *A45D 44/02* | (2006.01) |
| *B01F 35/21* | (2022.01) |
| *B01F 35/213* | (2022.01) |
| *B01F 35/22* | (2022.01) |
| *G06K 7/10* | (2006.01) |
| *G06Q 10/0875* | (2023.01) |
| *G06Q 30/0601* | (2023.01) |
| *B01F 101/06* | (2022.01) |
| *B01F 101/21* | (2022.01) |

(52) U.S. Cl.
CPC .............. *A45D 44/02* (2013.01); *B01F 33/84* (2022.01); *B01F 33/848* (2022.01); *B01F 35/2117* (2022.01); *B01F 35/213* (2022.01); *B01F 35/2207* (2022.01); *G06K 7/10297* (2013.01); *G06Q 10/0875* (2013.01); *G06Q 30/0635* (2013.01); *A45D 19/0066* (2021.01); *A45D 2200/058* (2013.01); *B01F 2101/06* (2022.01); *B01F 2101/21* (2022.01)

(56) References Cited

U.S. PATENT DOCUMENTS

| | | |
|---|---|---|
| 3,878,907 A | 4/1975 | Morick |
| 4,046,287 A | 9/1977 | Hoekstra et al. |
| 4,434,467 A | 2/1984 | Scott |
| 4,469,146 A | 9/1984 | Campbell et al. |
| 4,637,527 A | 1/1987 | Arrigoni |
| 4,656,600 A | 4/1987 | Swann |
| 4,697,938 A | 10/1987 | Sakura et al. |
| 4,705,083 A | 11/1987 | Rossetti |
| 4,792,236 A | 12/1988 | Heinis et al. |
| 4,840,239 A | 6/1989 | Slagg |
| 4,871,262 A | 10/1989 | Krauss et al. |
| 4,967,938 A | 11/1990 | Hellenberg |
| 5,078,302 A | 1/1992 | Hellenberg |
| 5,119,973 A | 6/1992 | Miller et al. |
| 5,153,825 A | 10/1992 | Yauk et al. |
| 5,163,010 A | 11/1992 | Klein et al. |
| 5,193,720 A | 3/1993 | Mayberry |
| 5,268,849 A | 12/1993 | Howlett et al. |
| 5,328,057 A | 7/1994 | Hellenberg et al. |
| 5,365,722 A | 11/1994 | Edwards et al. |
| 5,368,196 A | 11/1994 | Hellenberg et al. |
| 5,402,834 A | 4/1995 | Levin et al. |
| 5,474,211 A | 12/1995 | Hellenberg |
| 5,487,603 A | 1/1996 | Hoff et al. |
| 5,493,840 A | 2/1996 | Cane |
| 5,511,695 A | 4/1996 | Chia et al. |
| 5,544,684 A | 8/1996 | Robinette, III |
| 5,554,197 A | 9/1996 | Assini et al. |
| 5,558,251 A | 9/1996 | Neri |
| 5,632,314 A | 5/1997 | Koppe et al. |
| 5,697,527 A | 12/1997 | Altieri, Jr. et al. |
| 5,711,458 A | 1/1998 | Langeveld et al. |
| 5,784,854 A | 7/1998 | Mazzalveri |
| 5,855,626 A | 1/1999 | Wiegner et al. |
| 5,862,947 A | 1/1999 | Wiegner et al. |
| 5,938,080 A | 8/1999 | Haaser et al. |
| 5,992,691 A | 11/1999 | Post et al. |
| 6,003,731 A | 12/1999 | Post et al. |
| 6,089,408 A | 7/2000 | Fox |
| 6,164,499 A | 12/2000 | Chia |
| 6,180,892 B1 | 1/2001 | Li |
| 6,191,371 B1 | 2/2001 | Olberg et al. |
| 6,360,961 B1 | 3/2002 | Marazzi |
| 6,490,492 B1 | 12/2002 | Fertig et al. |
| 6,510,366 B1 | 1/2003 | Murray et al. |
| 6,672,341 B2 | 1/2004 | Bartholomew et al. |
| 6,782,307 B2 | 8/2004 | Wilmott et al. |
| 6,856,861 B2 | 2/2005 | Dirksing et al. |
| 6,935,386 B2 | 8/2005 | Miller et al. |
| 6,991,004 B2 | 1/2006 | Kaufhold et al. |
| 7,099,740 B2 | 8/2006 | Bartholomew et al. |
| 7,121,430 B2 | 10/2006 | Mink et al. |
| 7,147,012 B2 | 12/2006 | Kaufhold et al. |
| 7,185,789 B2 | 3/2007 | Mink et al. |
| 7,557,311 B2 | 7/2009 | Umemoto |
| 7,654,416 B2 | 2/2010 | Buining et al. |
| 7,690,405 B2 | 4/2010 | Miller et al. |
| 7,873,435 B2 | 1/2011 | Yuyama et al. |
| 7,963,303 B2 * | 6/2011 | Saranow ............ G01G 23/3728 |
| | | 141/83 |
| 8,336,582 B2 * | 12/2012 | Saranow ................. B01F 33/84 |
| | | 141/83 |
| 8,393,358 B2 * | 3/2013 | Saranow .............. A45D 44/005 |
| | | 141/2 |
| 8,567,455 B2 * | 10/2013 | Saranow ............. B01F 33/8442 |
| | | 141/83 |
| 8,897,915 B2 * | 11/2014 | Saranow ................ G06Q 10/10 |
| | | 700/239 |
| 9,073,026 B2 | 7/2015 | Engels et al. |
| 9,149,108 B2 | 10/2015 | Miller et al. |
| 9,177,339 B2 * | 11/2015 | Saranow ............ G06Q 30/0621 |
| 9,414,665 B2 | 8/2016 | Saranow et al. |
| 9,504,306 B2 | 11/2016 | Miller et al. |
| 9,524,605 B2 | 12/2016 | Saranow et al. |
| 9,567,118 B2 | 2/2017 | Rodrigues |
| 9,839,278 B2 | 12/2017 | Saranow et al. |
| 9,877,569 B2 | 1/2018 | Miller et al. |
| 9,919,278 B2 | 3/2018 | Saranow et al. |
| 10,143,984 B2 | 12/2018 | Krom, Jr. et al. |
| 10,182,638 B2 | 1/2019 | Saranow et al. |
| 10,716,386 B2 | 7/2020 | Miller et al. |
| 10,897,979 B1 | 1/2021 | Nash et al. |
| 11,235,298 B2 | 2/2022 | Saranow et al. |
| 11,246,395 B2 | 2/2022 | Saranow et al. |
| 11,344,103 B2 | 5/2022 | Nash et al. |
| 11,375,801 B2 | 7/2022 | Miller et al. |
| 2002/0071604 A1 | 6/2002 | Orpaz et al. |
| 2002/0124017 A1 | 9/2002 | Mault |
| 2003/0065450 A1 | 4/2003 | Leprince |
| 2004/0103035 A1 | 5/2004 | Pitsch |
| 2004/0122553 A1 | 6/2004 | Phan et al. |
| 2004/0159676 A1 | 8/2004 | Adema |
| 2004/0243259 A1 | 12/2004 | Peterson et al. |
| 2004/0247421 A1 | 12/2004 | Saunders et al. |
| 2005/0092772 A1 | 5/2005 | Miller et al. |
| 2005/0130613 A1 | 6/2005 | Kutsana et al. |
| 2005/0165705 A1 | 7/2005 | Lauper et al. |
| 2005/0194403 A1 | 9/2005 | Mink et al. |
| 2005/0252934 A1 | 11/2005 | Miller et al. |
| 2005/0264794 A1 | 12/2005 | Inzinna, Jr. et al. |
| 2005/0278870 A1 | 12/2005 | Gaspini |
| 2006/0033907 A1 | 2/2006 | Inzinna, Jr. |
| 2006/0124743 A1 | 6/2006 | Venema et al. |
| 2006/0181707 A1 | 8/2006 | Gibson et al. |

(56)     References Cited

U.S. PATENT DOCUMENTS

| | | |
|---|---|---|
| 2006/0231578 A1 | 10/2006 | Mink et al. |
| 2006/0261089 A1 | 11/2006 | Mink et al. |
| 2006/0283521 A1 | 12/2006 | Bartholomew et al. |
| 2007/0044863 A1 | 3/2007 | Engels et al. |
| 2007/0084520 A1 | 4/2007 | Driessen et al. |
| 2007/0124009 A1 | 5/2007 | Bradley et al. |
| 2007/0199159 A1 | 8/2007 | Schmenger et al. |
| 2007/0222547 A1* | 9/2007 | Stahle ................ A45D 44/005 |
| | | 336/125 |
| 2008/0178399 A1 | 7/2008 | Vena et al. |
| 2009/0218007 A1 | 9/2009 | Saranow et al. |
| 2009/0248199 A1 | 10/2009 | Milhorn |
| 2010/0175931 A1 | 7/2010 | Amato |
| 2010/0318220 A1 | 12/2010 | Saranow et al. |
| 2011/0100504 A1 | 5/2011 | Saranow et al. |
| 2012/0075331 A1 | 3/2012 | Mallick et al. |
| 2012/0127819 A1 | 5/2012 | Saranow et al. |
| 2012/0152406 A1 | 6/2012 | Bartholomew et al. |
| 2013/0123923 A1 | 5/2013 | Pavlov et al. |
| 2013/0123973 A1 | 5/2013 | Saranow et al. |
| 2013/0261798 A1 | 10/2013 | Saranow et al. |
| 2014/0082854 A1 | 3/2014 | Landa et al. |
| 2015/0082553 A1 | 3/2015 | Landa et al. |
| 2015/0089751 A1 | 4/2015 | Landa et al. |
| 2017/0035186 A1 | 2/2017 | Saranow et al. |
| 2017/0071317 A1 | 3/2017 | Miller et al. |
| 2017/0119130 A1 | 5/2017 | Witchell et al. |
| 2017/0189870 A1 | 7/2017 | Saranow et al. |
| 2017/0206678 A1 | 7/2017 | Kowalczyk et al. |
| 2018/0103743 A1 | 4/2018 | McKenzie et al. |
| 2018/0168321 A1 | 6/2018 | Saranow et al. |
| 2018/0220777 A1 | 8/2018 | Miller et al. |
| 2018/0257052 A1 | 9/2018 | Saranow et al. |
| 2019/0144178 A1 | 5/2019 | McKenzie et al. |
| 2019/0218002 A1 | 7/2019 | McKenzie et al. |
| 2020/0015574 A1 | 1/2020 | Witchell et al. |
| 2020/0121583 A1 | 4/2020 | Russell |
| 2020/0239206 A1 | 7/2020 | McKenzie et al. |
| 2022/0297907 A1 | 9/2022 | McKenzie et al. |
| 2022/0332481 A1 | 10/2022 | McKenzie et al. |

FOREIGN PATENT DOCUMENTS

| | | |
|---|---|---|
| EP | 0 484 564 A1 | 5/1992 |
| EP | 1 093 842 A1 | 4/2001 |
| EP | 1 240 845 A1 | 9/2002 |
| EP | 2 193 781 A1 | 6/2010 |
| FR | 2 619 730 A1 | 3/1989 |
| JP | 58-41966 A | 3/1983 |
| JP | 5-140470 A | 6/1993 |
| JP | 2002-15056 A | 1/2002 |
| JP | 2002-123723 A | 4/2002 |
| JP | 2002-524172 A | 8/2002 |
| JP | 2003-33217 A | 2/2003 |
| JP | 2009-536532 A | 10/2009 |
| JP | 2012-510104 A | 4/2012 |
| KR | 2000-0059262 A | 10/2000 |
| TW | 200831887 A | 8/2008 |
| TW | 201022980 A1 | 6/2010 |
| WO | 02/083282 A1 | 10/2002 |
| WO | 03/090914 A2 | 11/2003 |
| WO | 2004/101689 A2 | 11/2004 |
| WO | 2010/058381 A1 | 5/2010 |
| WO | 2010/100231 A1 | 9/2010 |
| WO | 2011/024160 A1 | 3/2011 |
| WO | 2012/112497 A2 | 8/2012 |

* cited by examiner

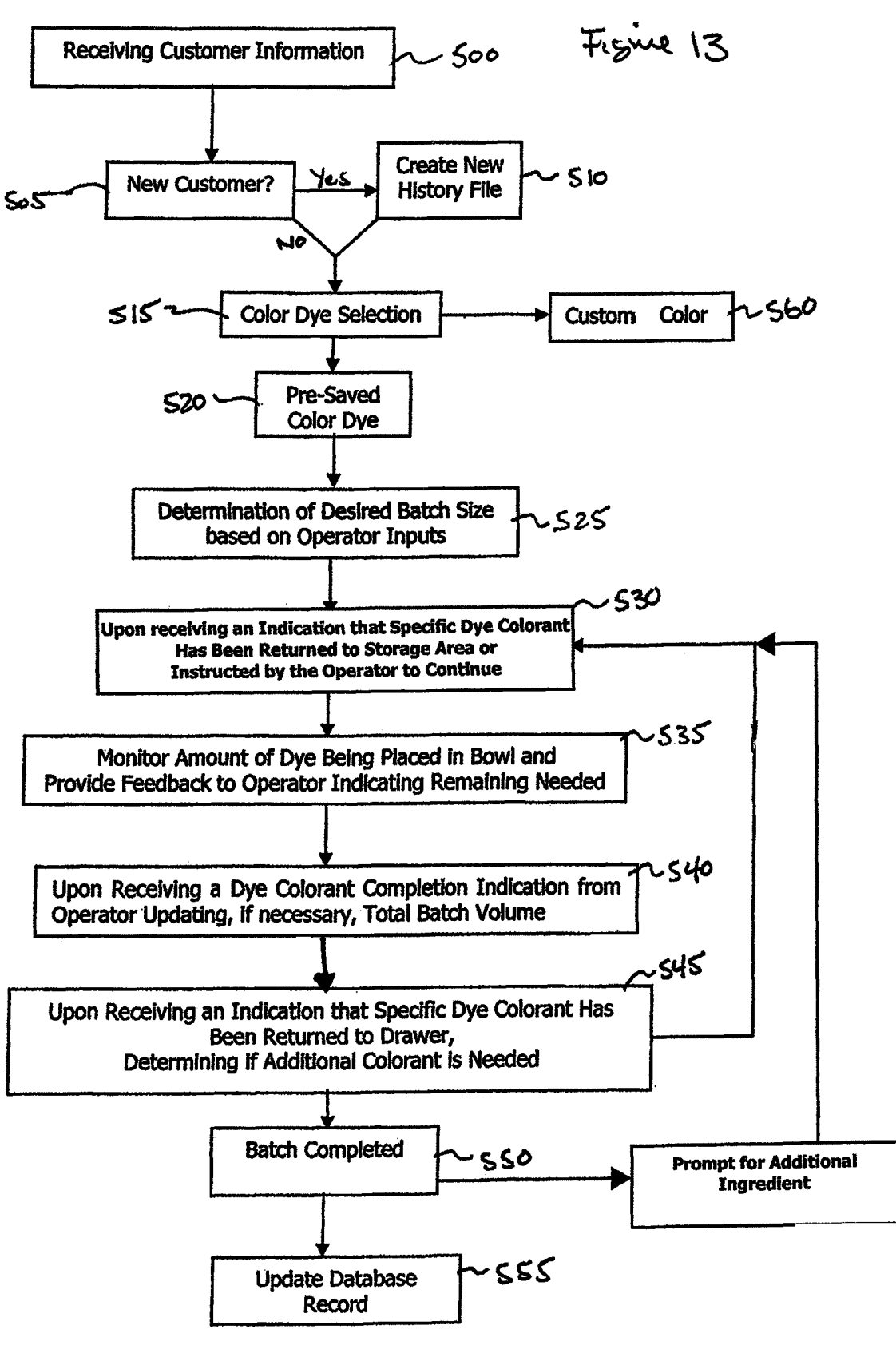

Figure 13

Receiving Customer Information ~ 500

New Customer? — Yes → Create New History File ~ 510
505
No

515 ~ Color Dye Selection → Custom Color ~ 560

520 ~ Pre-Saved Color Dye

Determination of Desired Batch Size based on Operator Inputs ~ 525

Upon receiving an Indication that Specific Dye Colorant Has Been Returned to Storage Area or Instructed by the Operator to Continue ~ 530

Monitor Amount of Dye Being Placed in Bowl and Provide Feedback to Operator Indicating Remaining Needed ~ 535

Upon Receiving a Dye Colorant Completion Indication from Operator Updating, if necessary, Total Batch Volume ~ 540

Upon Receiving an Indication that Specific Dye Colorant Has Been Returned to Drawer, Determining if Additional Colorant is Needed ~ 545

Batch Completed ~ 550 → Prompt for Additional Ingredient

Update Database Record ~ 555

Figure 14

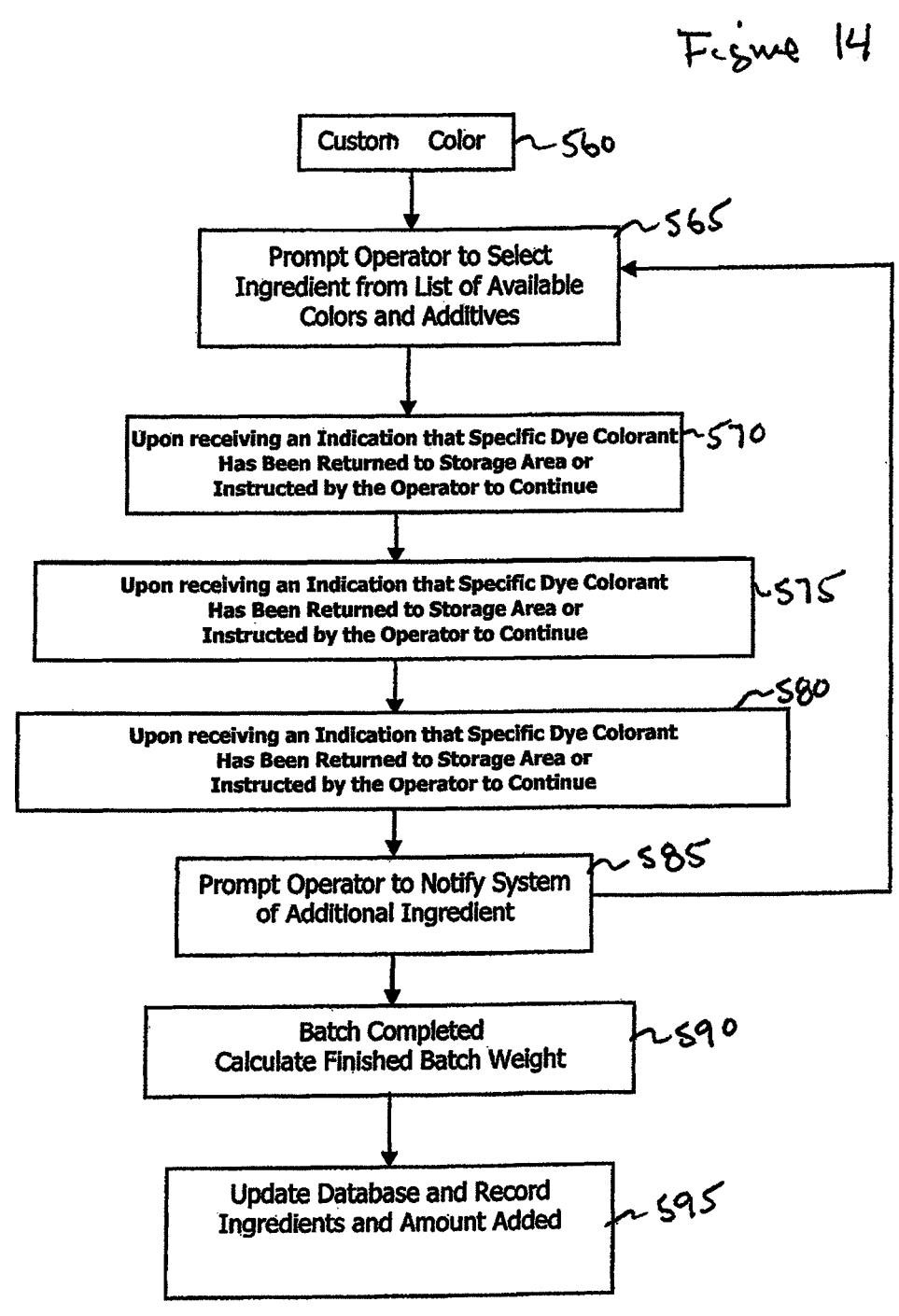

Custom Color ~560

Prompt Operator to Select Ingredient from List of Available Colors and Additives ~565

Upon receiving an Indication that Specific Dye Colorant Has Been Returned to Storage Area or Instructed by the Operator to Continue ~570

Upon receiving an Indication that Specific Dye Colorant Has Been Returned to Storage Area or Instructed by the Operator to Continue ~575

Upon receiving an Indication that Specific Dye Colorant Has Been Returned to Storage Area or Instructed by the Operator to Continue ~580

Prompt Operator to Notify System of Additional Ingredient ~585

Batch Completed Calculate Finished Batch Weight ~590

Update Database and Record Ingredients and Amount Added ~595

BLENDING STATION APPARATUS AND METHOD FOR USING THE SAME

CROSS REFERENCE TO RELATED APPLICATIONS

This application is a continuation of U.S. patent application Ser. No. 16/529,604, filed Nov. 21, 2019, which is a continuation of U.S. patent application Ser. No. 15/912,109, filed Mar. 5, 2018, which is a continuation of U.S. patent application Ser. No. 15/463,482 filed Mar. 20, 2017, now U.S. Pat. No. 9,919,278 issued Mar. 20, 2018, which is a continuation of U.S. patent application Ser. No. 13/893,155 filed May 13, 2013, now U.S. Pat. No. 9,623,388 issued Apr. 18, 2017, which is a continuation of U.S. patent application Ser. No. 12/986,448 filed Jan. 7, 2011, now U.S. Pat. No. 8,567,455 issued Oct. 29, 2013, which is a continuation-in-part of U.S. patent application Ser. No. 12/849,427 filed Aug. 3, 2010, now U.S. Pat. No. 8,393,363 issued Mar. 12, 2013, which is continuation-in-part of U.S. patent application Ser. No. 12/396,050 filed Mar. 2, 2009, now U.S. Pat. No. 7,963,303 issued Jun. 21, 2011, which claims priority to U.S. Provisional Application Ser. No. 61/033,053 filed Mar. 3, 2008 and U.S. Provisional Application Ser. No. 61/115,960 filed Nov. 19, 2008; all of which are hereby incorporated by reference.

COPYRIGHT NOTICE

FIELD OF THE DISCLOSURE

The disclosure relates to a blending station apparatus, or more particularly to a computer-driven, semi-automatic or manual apparatus for mixing components to produce a desired mixture thereof.

BACKGROUND

The present disclosure can be used in various fields and have various applications. In one such field, namely, cosmetics and hair dye preparations, the current field packages hair dyes in small tubes and bottles. They further provide a salon with a recipe chart that shows how much of ingredient "A" is to be mixed with how much of ingredients "B" and "C" and "D" to produce the desired end color. To produce the desired color, the colorist must first locate the required ingredients. This can be a challenge unto itself at a busy salon with multiple colorists. In addition, with as many as 60+ ingredients per colorant line, using the correct materials is very important. The next step is to squeeze or pour the approximate amounts of each ingredient into a mixing bowl. Coarse measurement devices and techniques are currently used, so it is a process with very little control over the end product. This current method employed by most salons lacks precision and control and does not ensure correct results. Stock color recipes are listed on a color chart provided by the colorant manufacturer. Color formulations are often adjusted to suit a particular customer's needs. These custom colors are typically recorded on 3×5 cards or other manually prepared means and filed away for future reference. The drawbacks to this approach include: inaccurate volumetric means (" . . . add ½ capful . . . " "Squeeze tube to line . . . "); end results are highly dependent on operator skill level; no controls are available to monitor outcomes; and customer records are hand-written with no backup. This creates a cluttered and disorganized process devoid of accurate measurement.

Fully-automatic dispensers designed for hair coloring materials were introduced in the 1990's to address the weaknesses of the current hand-mixing process. These dispensers automatically measured the correct amount of each ingredient with great precision and a software database stored the stock color recipes as well as specially created blends. Since the formulation and customer information were stored electronically, locating the required information was quick and easy. Files could also be backed up so valuable customer history data was more secure and easily shared with other locations. However, the earlier dispensers required specially designed internal storage bags for the various color components. The bags typically held one quart and were specially constructed to eliminate the possibility of air infiltration, which would oxidize and ruin the dye. Bulk packaging required less user maintenance by salon personnel, but required manufacturers to incur sizeable capital costs to add additional filling lines at great cost to the manufacturer to accommodate the special bags. Major drawbacks of the fully automatic offerings included their high cost, complexity with high maintenance requirements, and they were costly for hair color producers to adopt due to specialized packaging requirements. Therefore, there is a need for a process which is a simpler, more cost-effective approach and which eliminates the drawbacks of earlier designs.

As seen for this one example, a number of other fields and applications face similar problems. When a person needs to blend or mix a number of components, the need to eliminate waste, create a cost-effective approach to aid the user, and provide the mechanism is which the mixture can be continuously created in a manner that mimics as close as possible to obtain the desired mixture is highly desired. There is a need to provide a monitorial approach, coupled with accurate measurement means to eliminate the potential for error and improve the overall accuracy. Optional features include product receptacles or drawers that can be locked and unlocked, to reduce theft and clutter, more easily locate the required ingredients, and to help manage inventory. Other options include the automatic metering of the most commonly used ingredients to accelerate the mixing process.

SUMMARY

One or more of the embodiments in the blending system aims to bring control to an otherwise uncontrolled process at a substantial reduction of cost. In one embodiment, the blending system includes a control system having at least a processor, a computer-readable memory, and a display, wherein the memory contains software configured to receive a formula defining instructions for preparing a blended mixture using one or more blending materials and amounts for the blended mixture using a scale. The blending system further includes management software stored in the computer-readable memory and executed by the control system, the software in communication with the control system to exchange information on customers and formulas for blended mixtures associated with the customers. Additionally, the control system includes software configured to calculate information associated with the one or more blending materials and the blended mixture when input is received by the control system and displays the calculated information associated with the one or more blending materials and the blended mixture on the display.

Some blending systems include (or interface with) a control system, a precision scale, a computer-based recipe management system, optional storage to manage and protect blending ingredients, and optional locks to minimize theft. The blending station may include (or interface with) a keyboard, LCD screen, and an electronic scale to provide feedback on exactly how much of each ingredient has actually been added to the batch.

In one embodiment of the blending system, a system is provided for the preparation of blended mixtures, such as but not limited to hair color mixtures, personal care product mixtures, and the like. The system includes a computer control system having at least a memory, input controls, and a display, the memory having the capacity to store and/or storing at least one mixture formulated from the mixing of one or more components, such as but not limited to blending materials. The system may also interface with a scale connected to the control system, where the control system monitors a weight on the scale and provides information on changes thereto. In addition, the computer control system upon receiving an input for a creation of a mixture, displays a formulation of the mixture indicating the components and amounts needed to create the desired mixture.

In another aspect of one embodiment, there is provided a computer control system which monitors changes in the weight of the scale and adjusts the formulation when a weight of a component added to the mixture is different than a recommended formulated amount and the computer control system receives an input to accept the different weight of the component. The computer control system may also monitor changes in the weight on the scale and display information, which may be related to a recommended formulated amount of a component and/or an amount of the component actually added to the scale.

The computer control system may also be linked to management software to exchange information on customers and formulations of mixtures associated with the customers. The computer control system may store any changes in the formulation of the mixture in memory. The computer control system may also store in memory, any changes in the formulation of the mixture and send the changes in the formulation of the mixture to the management software. Yet in other aspects, the control system may adjust the formulation of a mixture upon receiving an input on a total amount of mixture required or a strength of the mixture. Further embodiments provide for receiving an input that the mixture is a custom blended mixture. The control system may further display a listing of components and blending materials, illuminate indicator(s) for particular selected component(s), monitor a separate amount and a total amount of the components placed in a bowl or other container, and store a blended mixture upon receiving an input the mixture is completed.

In another non-limiting embodiment of the blended system, the operator enters the customer name into the management system and the computer screen displays the customer's history. If this is a new customer, a history file is created. The operator may select desired components from a palette chart, recipe book, customer history file, or other appropriate source, and enters the required amount of finished components. A validation system can also be used to control the ingredient solution and control process. A batch record may be placed in the customer's history file.

A blending method for preparing a blended mixture may be summarized as including providing a control system having at least a processor, a computer-readable memory, and a display, wherein the memory contains software configured to receive a formula defining instructions for preparing a blended mixture using one or more blending materials and amounts for producing a batch size of the blended mixture on a scale; accessing custom blending software stored in the computer-readable memory and executed by the control system, wherein upon receiving input prompting creation of a custom blended mixture, the custom blending software further prompts a user to select or enter one or more blending materials; monitoring a weight on the scale as blending materials are added to a receptacle on the scale, both individually and in total; indicating on the display the amounts of the blending materials that have been added to the scale, both individually and in total, to prepare an amount of a custom blended mixture based upon the selected blending materials; determining an end weight of the custom blended mixture after a user has used the custom blended mixture; and recalculating a needed amount of the custom blended mixture by subtracting the end weight of the custom blended mixture from the prepared amount of the custom blended mixture.

The method may further include storing adjustments to the formula of the stored blended mixture in the memory. The method may further include recalculating the formula of a blended mixture upon receiving a change to a total amount of the blended mixture needed or a change to a strength of the blended mixture needed. The method may further include validating the blending materials being adding to the receptacle by comparing a manufacturer's product packaging being used against the blending materials in the formula to ensure and validate accurate production of the blended mixture, wherein the manufacturer's product packaging being used is current product packaging that does not have specialized packaging requirements.

The method may further include scanning, using a barcode scanner in connection with validation software, one or more barcodes positioned on product packaging to validate that the scanned manufacturer's product packaging is current product packaging that does not have specialized packaging requirements. The method may further include receiving information, using a RFID reader, from one or more RFID tags positioned on product packaging to validate that a manufacturer's product packaging is current product packaging that does not have specialized packaging requirements. The blended mixture may be selected from a group consisting of dyes, colorants, activators, base ingredients, additives, personal care product mixtures, beauty products, foods, and combinations thereof.

A blending method for preparing a blended mixture may be summarized as including providing a control system having at least a processor, a computer-readable memory, and a display, wherein the memory contains software configured to receive a formula defining instructions for preparing a blended mixture using one or more blending materials and amounts for the blended mixture using a scale; monitoring a weight on the scale, using the control system, as blending materials are added to a receptacle on the scale, both individually and in total; indicating on the display the amounts of the blending materials that have been added to the scale, both individually and in total, wherein the indicated amounts of the blending materials are presented as a representation of an amount of one or more of the blending materials from the blended mixture being added to the scale determining an end weight of the custom blended mixture after a user has used the custom blended mixture, and recalculating a needed amount of the custom blended mixture by subtracting the end weight of the custom blended mixture from the prepared amount of the custom blended mixture. The representation may be a graph. The representation may be one of the following: a bar-graph, a line graph, a circular graph, and a pictorial graph, and the representation is either color coded or gradation coded. The blended mixture may be selected from a group consisting of dyes, colorants, activators, base ingredients, additives, personal care product mixtures, beauty products, foods, and combinations thereof.

A blending method for preparing a blended mixture may be summarized as including providing a control system having at least a processor, a computer-readable memory, and a display, wherein the memory contains software configured to receive a formula defining instructions for preparing a blended mixture using one or more blending materials and amounts for the blended mixture using a scale; accessing management software stored in the computer-readable memory and executed by the control system, the management software in communication with the control system to exchange information on customers and formulas for blended mixtures associated with the customers; monitoring a weight on the scale as blending materials are added to a receptacle on the scale, both individually and in total; indicating on the display the amounts of the blending materials that have been added to the scale, both individually and in total, to prepare an amount of a custom blended mixture based upon the selected blending materials; determining an end weight of the custom blended mixture after a user has used the custom blended mixture; and recalculating a needed amount of the custom blended mixture by subtracting the end weight of the custom blended mixture from the prepared amount of the custom blended mixture.

The method may further include providing an input control device in communication with the control system. The method may further include monitoring a weight on the scale. The control system may recalibrate the scale to a zero weight, adjusted for the weight of a receptacle, when the control system receives an input indicating that a previous blending component added to the blended mixture is completed and the next blending component in the blended mixture is to be added. The blended mixture may be selected from a group consisting of dyes, colorants, activators, base ingredients, additives, personal care product mixtures, beauty products, foods, and combinations thereof.

A blending method for preparing a blended mixture may be summarized as including providing a control system having at least a processor, a computer-readable memory, and a display, wherein the memory contains software configured to receive a formula defining instructions for preparing a blended mixture using one or more blending materials and amounts for the blended mixture using a scale; and monitoring a weight on the scale as blending materials are added to a receptacle on the scale, both individually and in total; indicating on the display the amounts of the blending materials that have been added to the scale, both individually and in total; determining an end weight of the custom blended mixture after a user has used the custom blended mixture; recalculating a needed amount of the custom blended mixture by subtracting the end weight of the custom blended mixture from the prepared amount of the custom blended mixture; and storing a final amount used of each of the blending materials.

The method may further include tracking inventory of the one or more blending materials by reducing a current inventory level of each of the blending materials by the final amount used of each of the blending materials. The method may further include adjusting inventory levels of the one or more blending materials by increasing the current inventory levels by an amount received during a new shipment. The method may further include comparing inventory levels of the one or more blending materials received during a new shipment against a purchase order. The method may further include adjusting inventory levels by decreasing the current inventory level by an amount lost or spoiled. The method may further include monitoring a final amount used of each of the one or more blending materials; and determining a cost of each of the one or more blending materials used during preparation, wherein a final cost of the blended mixture is calculated.

The method may further include storing information in the memory, using history tracking software, the final amount used and final cost of the blending materials used in the preparation of the blended mixture. The method may further include storing information in the memory, using history tracking software, on a customer and an operator corresponding to the final amount used and final cost of the blending materials used in the preparation of the blended mixture. The method may further include creating a report based on the final amount used of the blending materials for a specified time period. The method may further include creating a report based on the final cost of the blending materials for a specified time period. The method may further include creating a report based on an average total cost per treatment by customer.

The method may further include creating a report based on an operator and an associated total use and/or total cost of the blending materials for a specified time period. The blended mixture may be selected from a group consisting of dyes, colorants, activators, base ingredients, additives, personal care product mixtures, beauty products, foods, and combinations thereof. The method may further include creating reports, using the control system, including information selected from one or more of specified time periods, usage, cost, operator, client, color, salon, chain of salons, manufacturer, product, product line, chair or booth renter, final usage, customer information, and average cost per client per treatment. The method may further include creating reports including information selected from two or more of specified time periods, usage, cost, operator, client, color, salon, chain of salons, manufacturer, product, product line, chair or booth renter, final usage, customer information, and average cost per client per treatment. The blended mixture may be selected from a group consisting of dyes, colorants, activators, base ingredients, additives, personal care product mixtures, beauty products, foods, and combinations thereof.

Another implementation of a blending system for preparing a blended mixture may be summarized as including: a control system, a plurality of receptacles, a scale, a pumping system, and a user input device. The control system has at least a processor, and a computer-readable memory, wherein the memory contains software configured to receive a formula defining instructions for preparing a blended mixture using one or more blending materials and amounts for producing a batch size of the blended mixture. The plurality of receptacles organize and store blending dye containers. Each receptacle has an indicator associated with the control system. The blending dye containers contain blending materials. The scale is electrically connected to the control system and provides feedback to the control system on how much of a given blending material was added to the mixture batch. The pumping system automatically pumps blending materials into a mixing bowl via pumping channels, wherein the pumping system is automatically controlled by the control system. The user input device enables one or more of input of a customer name, selection of a customer name, input of other customer identifying characteristic, or selection of other customer identifying characteristics into the control system, wherein the control system has a memory storing one or more of customer information and history of the customer's mixture. The user selects, via the control system, one or more of a previously stored finished mixture from the customer history, a previously stored dye color from the customer history, a finished mixture from an available list of known mixtures, or a new formula. The control system sends instructions to the user via an associated display in response to the user selection, wherein the instructions include prompting the user for a desired batch size of the blended mixture. The control system monitors a weight on the scale as blending materials are added to a mixing bowl on the scale, wherein a desired batch size of the blended mixture is prepared and added to the mixing bowl on the scale.

In some implementations, the blending system further includes metering pumps that measure ejection of the blending material from nozzles into the blended mixture. In other implementations of the blending system, the user input device is one or more of a keyboard, touchpad, or display panel. In still other implementations of the blending system, the control system enables one or more of editing, adding, and deleting of customer information, color schemes, or formulas. In yet other implementations of the blending system, the control system determines an end weight of any remaining blended mixture after the user has used the blended mixture. In other implementations of the blending system, the blended mixture is selected from one or more of dyes, colorants, activators, base ingredients, additives, personal care product mixtures, beauty products, and foods.

In some implementations of the blending system, the control system recalculates a needed amount of the blended mixture by subtracting the end weight of the blended mixture from a prepared amount of the blended mixture. In other implementations of the blending system, the control system stores adjustments to the formula of the blended mixture in the memory. In still other implementations of the blending system, the control system tracks inventory levels of the one or more blending materials by reducing a current inventory level of each of the blending materials by an amount used of each of the blending materials. In yet other implementations of the blending system, the control system tracks inventory levels of the quantities of the blending materials for re-ordering purposes.

Another implementation of a blending system for preparing a blended mixture may be summarized as including: providing a plurality of receptacles that organize and store blending dye containers, wherein each receptacle has an indicator associated with the control system, the blending dye containers containing blending materials; accessing a control system having at least a processor, a computer-readable memory, and a display, wherein the memory contains software configured to receive a formula defining instructions for preparing a blended mixture using one or more blending materials and amounts for the blended mixture, the memory further storing one or more of customer information and history of the customer's mixture; accessing management software stored in the computer-readable memory and executed by the control system, the management software in communication with the control system to exchange information on customers and formulas for blended mixtures associated with the customers; employing a scale electrically connected to the control system that provides feedback to the control system on how much of a given blending material was added to the mixture batch; receiving input from a user input device, wherein the user input device enables one or more of input of a customer name, selection of a customer name, input of other customer identifying characteristic, or selection of other customer identifying characteristics into the control system; receiving input from a user input device selecting one or more of a previously stored finished mixture from the customer history, a previously stored dye color from the customer history, a finished mixture from an available list of known mixtures, or a new formula; sending instructions to the user via an associated display in response to the user selection, wherein the instructions include prompting the user for a desired batch size of the blended mixture; initiating a pumping system that automatically pumps blending materials into a mixing bowl via pumping channels, wherein the pumping system is automatically controlled by the control system; and monitoring a weight on the scale as blending materials are added to a mixing bowl on the scale, wherein a desired batch size of the blended mixture is prepared and added to the mixing bowl on the scale.

In some implementations, the blending method further includes providing metering pumps that measure ejection of the blending material from nozzles into the blended mixture. In other implementations of the blending method, the user input device is one or more of a keyboard, touchpad, or display panel. In still other implementations of the blending method, the control system enables one or more of editing, adding, and deleting of customer information, color schemes, or formulas. In yet other implementations of the blending method, the control system determines an end weight of any remaining blended mixture after the user has used the blended mixture. In other implementations of the blending method, the blended mixture is selected from one or more of dyes, colorants, activators, base ingredients, additives, personal care product mixtures, beauty products, and foods.

In some implementations of the blending method, the control system recalculates a needed amount of the blended mixture by subtracting the end weight of the blended mixture from a prepared amount of the blended mixture. In other implementations of the blending method, the control system stores adjustments to the formula of the blended mixture in the memory. In still other implementations of the blending method, the control system tracks inventory levels of the one or more blending materials by reducing a current inventory level of each of the blending materials by an amount used of each of the blending materials. In yet other implementations of the blending method, the control system tracks inventory levels of the quantities of the blending materials for re-ordering purposes.

In some implementations, the blending method further includes adjusting inventory levels of the one or more blending materials by increasing the current inventory levels by an amount received during a new shipment. In other implementations, the blending method further includes comparing inventory levels of the one or more blending materials received during a new shipment against a purchase order. In still other implementations, the blending method further includes adjusting inventory levels by decreasing the current inventory level by an amount lost or spoiled.

Another implementation of a blending system for preparing a blended mixture may be summarized as including: a control system, a plurality of receptacles, a scale, a pumping system, and a user input device. The control system has at least a processor, and a computer-readable memory, wherein the memory contains software configured to receive a formula defining instructions for preparing a blended mixture using one or more blending materials and amounts for producing a batch size of the blended mixture. The plurality of receptacles organize and store blending dye containers. Each receptacle has an indicator associated with the control system. The blending dye containers contain blending materials. The scale is electrically connected to the control system and provides feedback to the control system on how much of a given blending material was added to the mixture batch. The pumping system automatically pumps blending materials into a mixing bowl, wherein the pumping system is automatically controlled by the control system. The user input device that receives input regarding the preparation of the blended mixture. The control system sends instructions to the user via an associated display in response to the user selection, wherein the instructions include prompting the user for a desired batch size of the blended mixture. The control system monitors a weight on the scale as blending materials are added to a mixing bowl on the scale, wherein a desired batch size of the blended mixture is prepared and added to the mixing bowl on the scale.

The user input device enables one or more of input of a customer name, selection of a customer name, input of other customer identifying characteristic, or selection of other customer identifying characteristics into the control system, wherein the control system has a memory storing one or more of customer information and history of the customer's mixture. The user selects, via the control system, one or more of a previously stored finished mixture from the customer history, a previously stored dye color from the customer history, a finished mixture from an available list of known mixtures, or a new formula.

Another implementation of a blending method for preparing a blended mixture may be summarized as including: providing a plurality of receptacles that organize and store blending dye containers, wherein each receptacle has an indicator associated with the control system, the blending dye containers containing blending materials; accessing a control system having at least a processor, a computer-readable memory, and a display, wherein the memory contains software configured to receive a formula defining instructions for preparing a blended mixture using one or more blending materials and amounts for the blended mixture, the memory further storing one or more of customer information and history of the customer's mixture; accessing management software stored in the computer-readable memory and executed by the control system, the management software in communication with the control system to exchange information on customers and formulas for blended mixtures associated with the customers; receiving input from a user input device input regarding preparation of the blended mixture; sending instructions to the user via an associated display in response to the user selection, wherein the instructions include prompting the user for a desired batch size of the blended mixture; initiating a pumping system that automatically pumps blending materials into a mixing bowl, wherein the pumping system is automatically controlled by the control system; and monitoring a weight on the scale as blending materials are added to a mixing bowl on the scale, wherein a desired batch size of the blended mixture is prepared and added to the mixing bowl on the scale.

BRIEF DESCRIPTION OF THE DRAWINGS

A fuller understanding of the foregoing may be had by reference to the accompanying drawings, wherein:

FIG. 13 is a block diagram illustrating the creation of a new hair dye formula;

FIG. 14 is a block diagram illustrating the creation of a custom color; and

DETAILED DESCRIPTION OF THE EMBODIMENTS

Figure 1A:
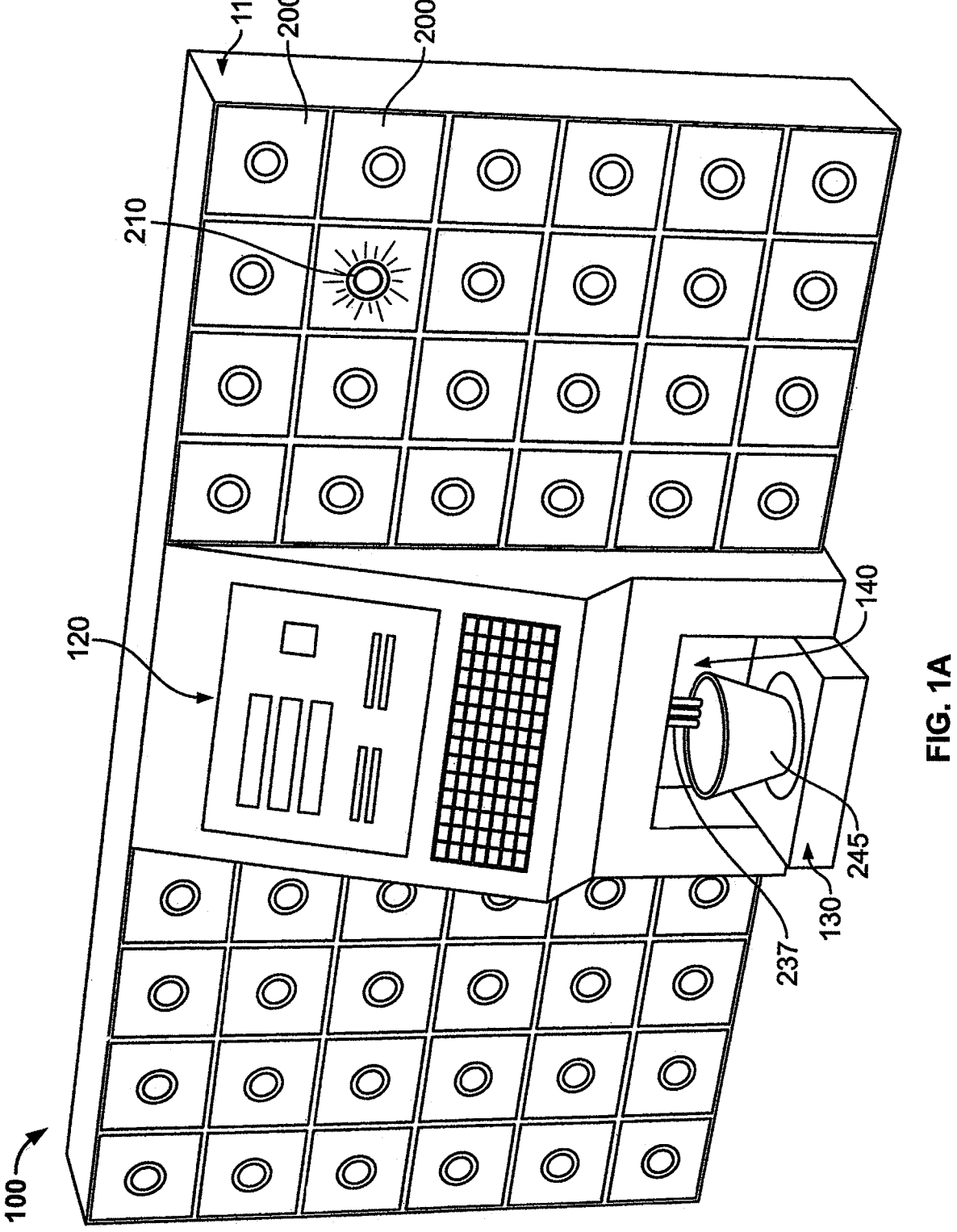
FIG. 1A is a perspective view of one embodiment of the system designed to control a manual process for mixing components, which includes a mixing station and optional storage receptacles.

While the blending system is susceptible to embodiments in many different forms, there are shown in the drawings and will described herein, in detail, the preferred embodiments of the blending system. It should be understood, however, that the present disclosure is to be considered an exemplification of the principles of the blending system and is not intended to limit the spirit or scope of the blending system, claims and/or embodiments illustrated.

Figure 1B:
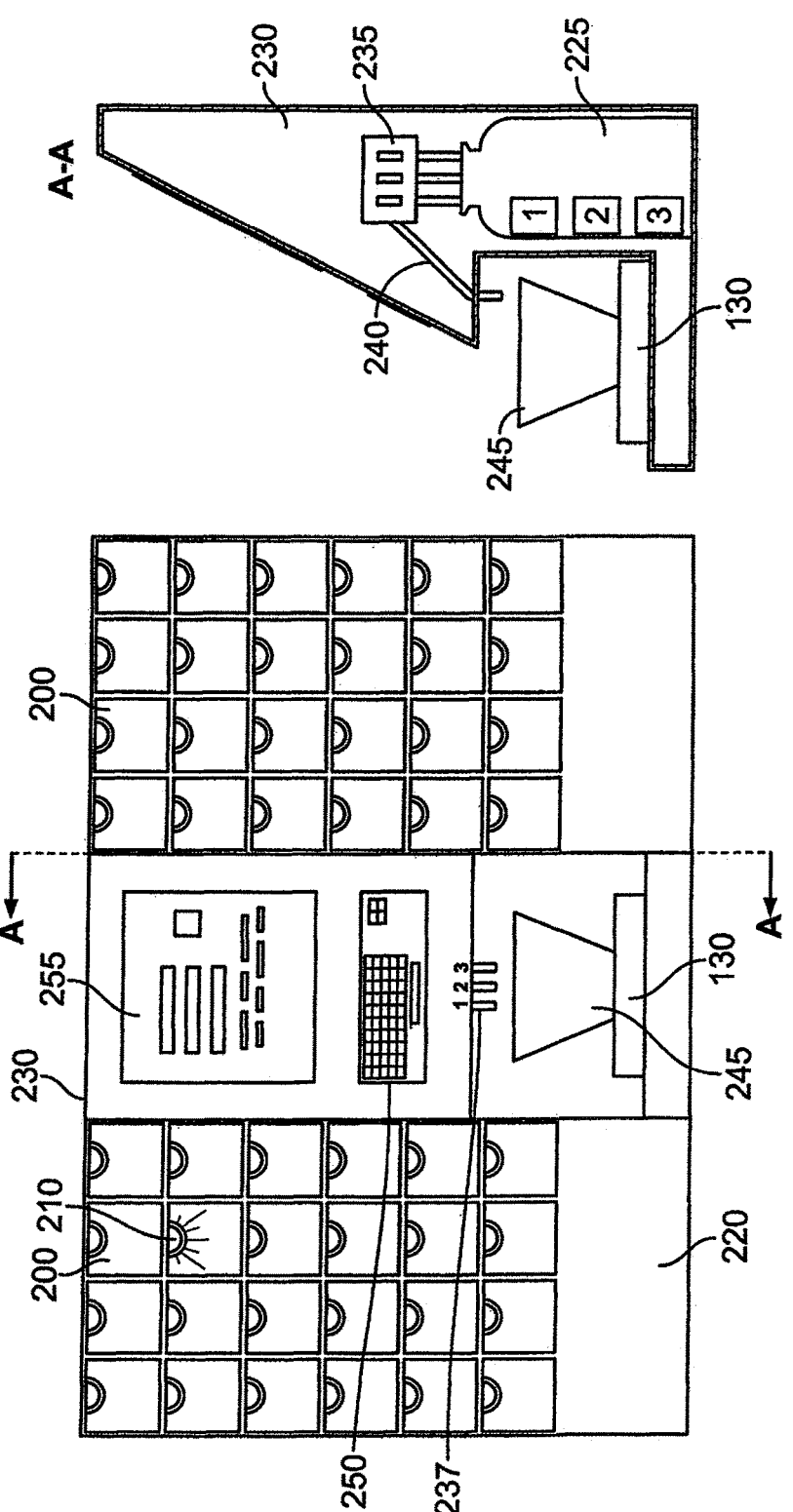
FIG. 1B is a first and cross-sectional view of the embodiment from FIG. 1A.
Figure 2:
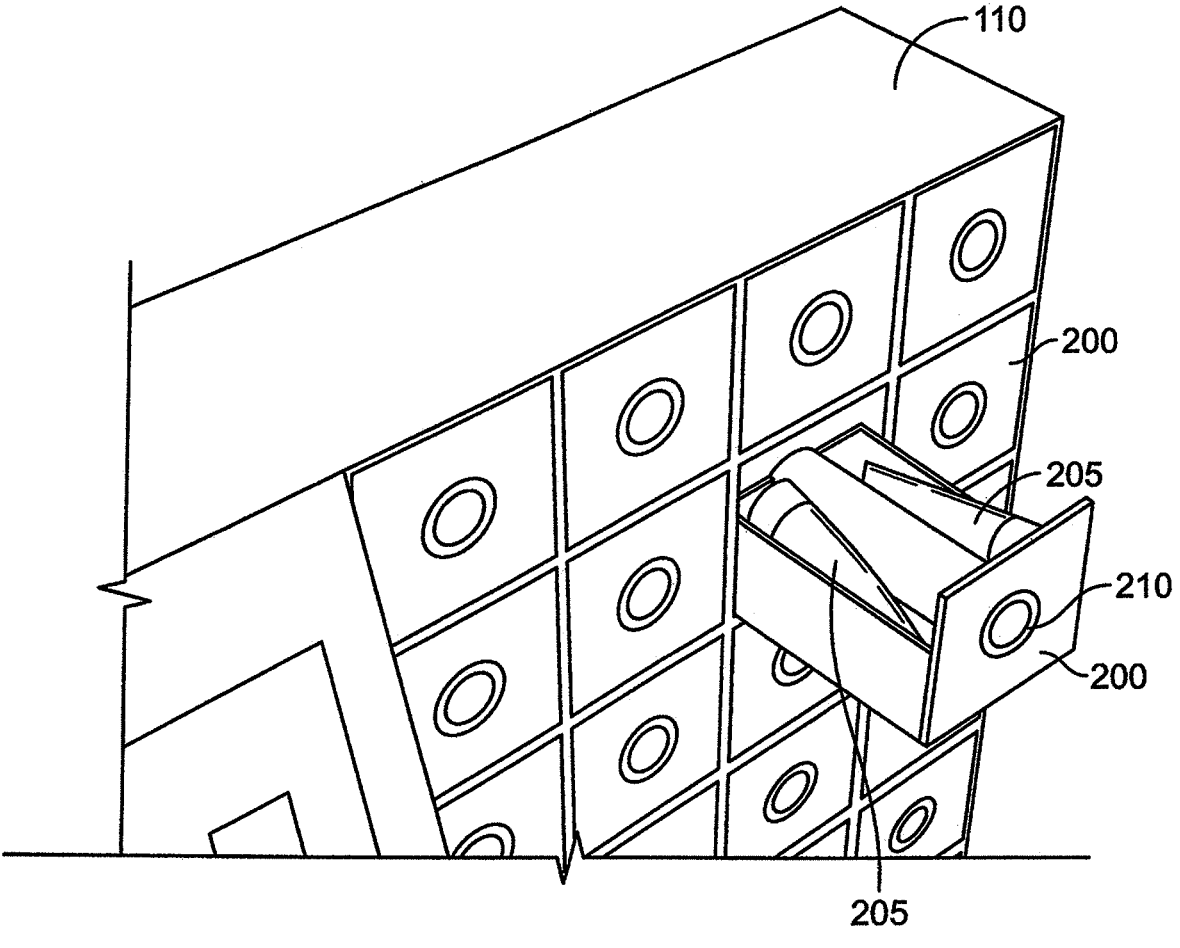
FIG. 2 is an enlarged view of a receptacle from FIG. 1A showing storage areas for the components.

In a first embodiment of the blending system, there is shown and described a system designed to control a manual process for mixing components and which brings control to an otherwise un-controlled process. The components can be various ingredients to a mixture, such as in but a few examples, dyes used for blending hair dye mixtures, components used for blending personal beauty products, foods, and the like. FIG. 1 shows one embodiment of the system, generally referenced as number 100. The system 100 includes organized storage of the components 110 (such as in one example, color blending ingredients), a computer-based recipe management system 120, and a small electronic scale 130 to monitor the mixing or blending process. In some embodiments, the blending system may include a pump 140 to add the common activators or ingredients, such as peroxides.

As shown in FIGS. 1-13, a number of different embodiments of the system 100 are illustrated. Each system 100 contains a number of drawers or receptacles 200 to organize and store the individual components, such as blending dye containers/tubes 205. Each receptacle/drawer 200 has an associated LED or other indicator 210 driven by the control system 220. A small digital scale 130 is electrically connected to the control system 220 to help provide feedback to the control system 220 on exactly how much of a given ingredient or activator was added to the mixture batch.

While not necessarily the preferred embodiment, it is possible to include several small reservoirs 225 of common ingredients, such as, bases and additives are stored within a center storage area 230. The reservoirs 225 are coupled with metering pumps 235 to measure the common ingredients which eject from nozzles 237 into a mixture batch. Pumping channels 240 are also automatically controlled by the control system 220. As illustrated, the common ingredients are either manually added or in the case of the above pumping system automatically pumped into a mixing bowl 245.

One embodiment of the blending system would be as follows:

(a) an operator enters/views the customer name or other identifying characteristic into the control system 220 via an integral keyboard 250 or touchpad and display panel 255;

(b) the control system 220 has a memory storing customer information and/or history of the customer's mixture, such as a specific or predefined color scheme; the control system similarly allows editing, adding, and deleting of customer information or formula;

(c) the operator may either select a previously stored desired finished mixture or dye color from the customer history, or from an available list of known mixtures or formulate a new formula;

(d) the operator is then prompted to enter the required amount of finished product (for example whether the operator needs 1 ounce, 2 ounces, etc.);

(d) the operator is instructed to place an empty batch container or mixing bowl 245 on the scale 130;

(e) the control system 220 will then illuminate or activate an LED or other type indicator 210 adjacent to a corresponding receptacle/drawer prompting the operator to select the specific component needed for the mixture; optionally the control system may control locking mechanisms on the receptacles to electronically open/close or lock/unlock the desired storage receptacle;

(f) the operator manually adds the amount of component that is indicated on the display panel 255 to the bowl 245; while the amount is being added, the computer system 220 monitors the scale 130 to determine exactly how much has been added; the display panel 255 indicates how close the addition is to the target weight by displaying how much more must be added, and provides feedback to the operator;

(g) after returning the component and closing the designated storage drawer/receptacle, the operator presses "next" (or any key specified by the computer system), and the next receptacle LED or other indicator is activated or illuminated along with the required amount of the next component or ingredient;

(h) steps (f) and (g) are repeated until all of the required components or color ingredients and activators have been added;

(i) once the batch has been completed, the precise amount of all ingredients are recorded into the customer's history file.

Had this been a custom blended mixture, a separate software function would be selected. Under this function, the operator would tell the system which ingredients were being added or deleted, and the system would record the exact amount of each addition or deletion via the integrated scale. When the batch was complete, a record of the custom blend would be stored in the customer's history file.

It is herein noted that any type of computer control system having a memory storage area, processor to run various programs, and other components well known in the computer industry can be used by the embodiments herein. The control system can be wired or wirelessly communicating with the plurality of storage receptacles to control the LED or other indicators 210 or other lighting, electronic locks, opening/closing and/or sound elements to help identify the specific receptacle(s) the operator will be using and the required amount to be manually dispensed to the bowl 245 to mix the specific components. Further, the control system is wired or wirelessly communicating with the electronic scale 130 and the monitor 255 to identify and display to the operator how much of a specific amount of component needs to be added into the bowl 245.

On return visits, information stored would be available to precisely re-create the mixture. This concept revolutionizes the way a mixture is produced, and especially when applied to the salons. It replaces a messy, uncontrolled mixing process with an easy-to-use, guided process to produce the exact mixture (such as an exact color of hair dye) time after time.

Figure 3:
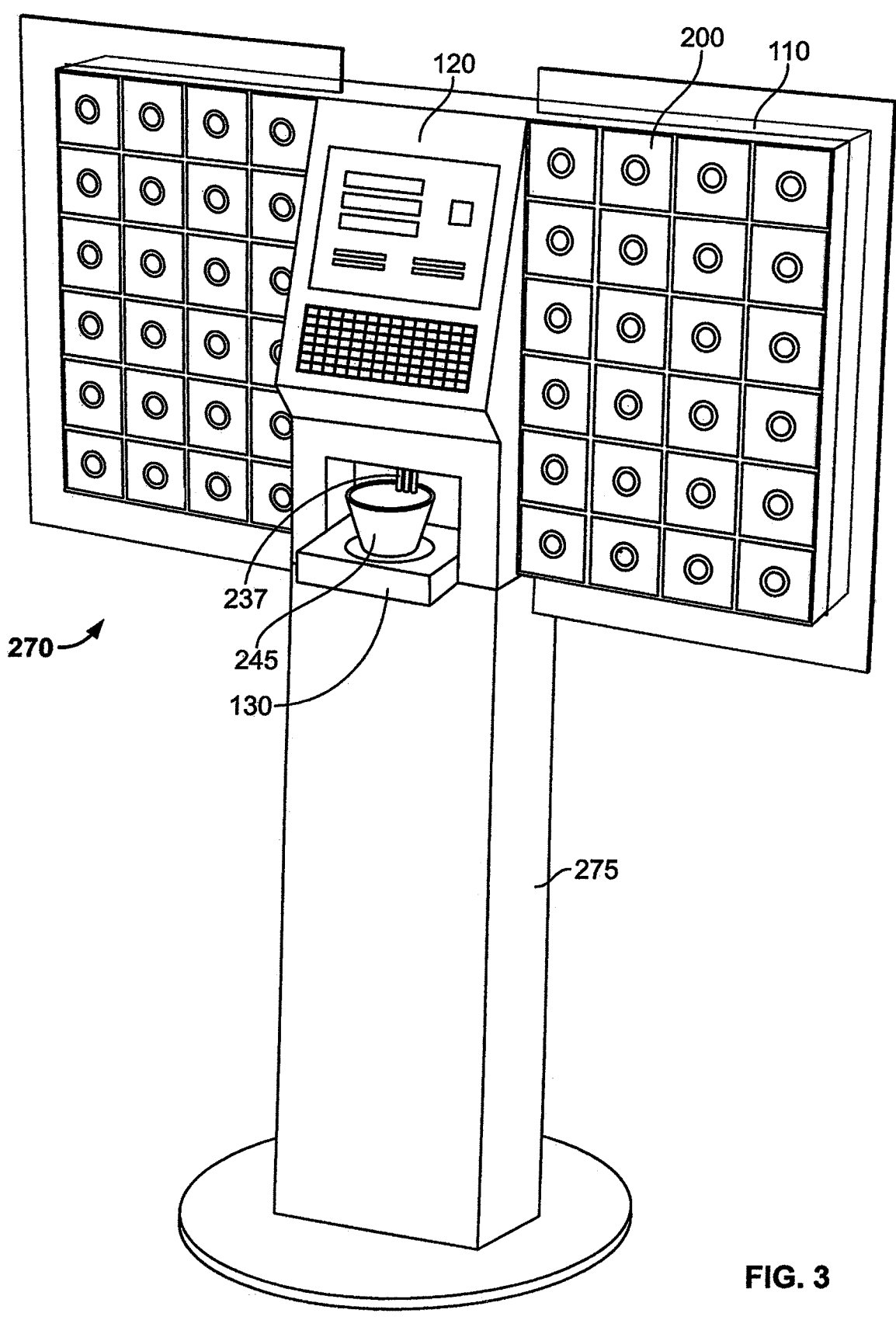
FIG. 3 is a perspective view of one embodiment of the system designed to control a manual process for mixing components, illustrating the use on a pedestal.
Figure 4:
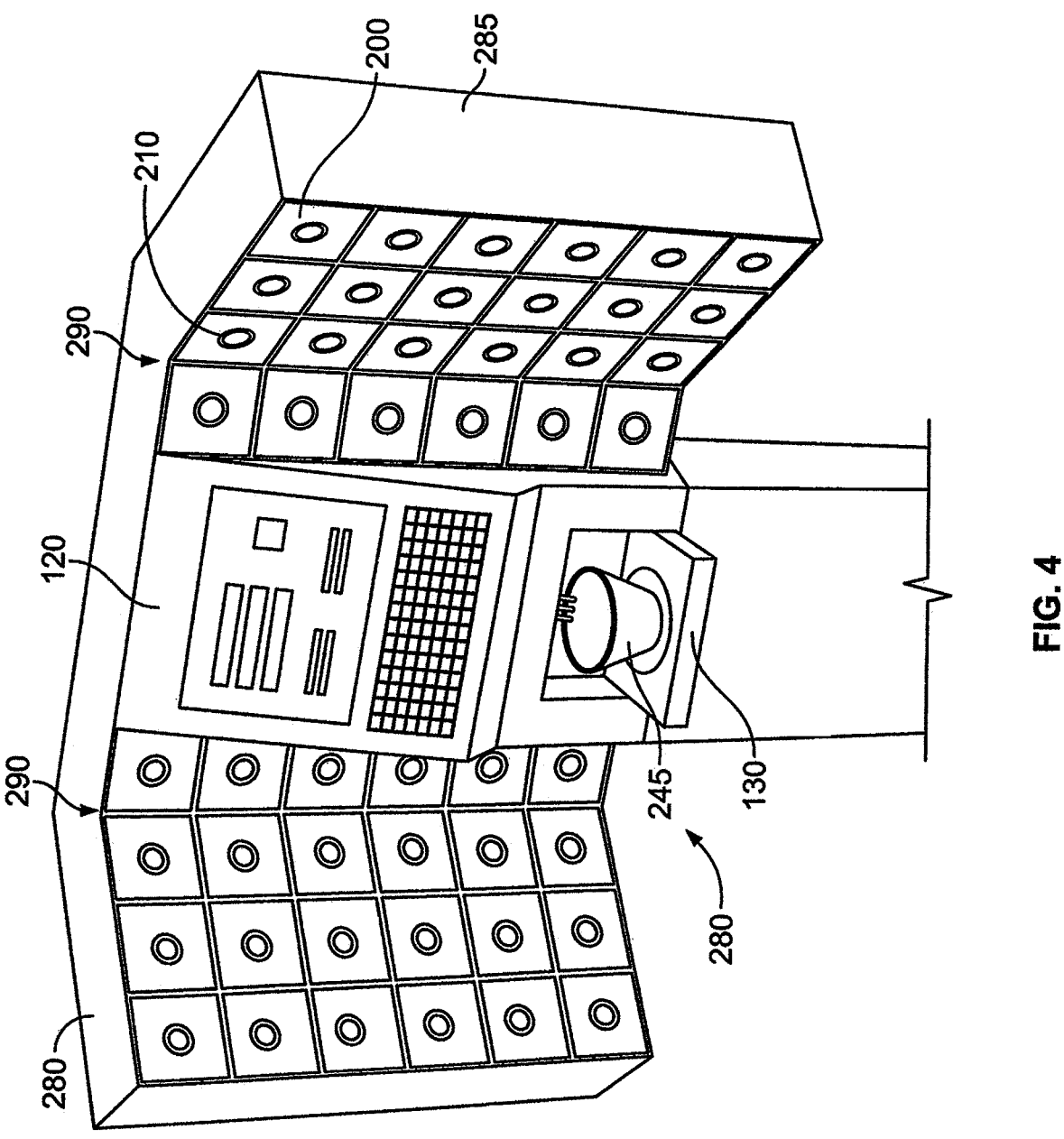
FIG. 4 is a perspective view of one embodiment of the system designed to control a manual process for mixing components, illustrating the use of curved receptacle storage areas.
Figure 5:
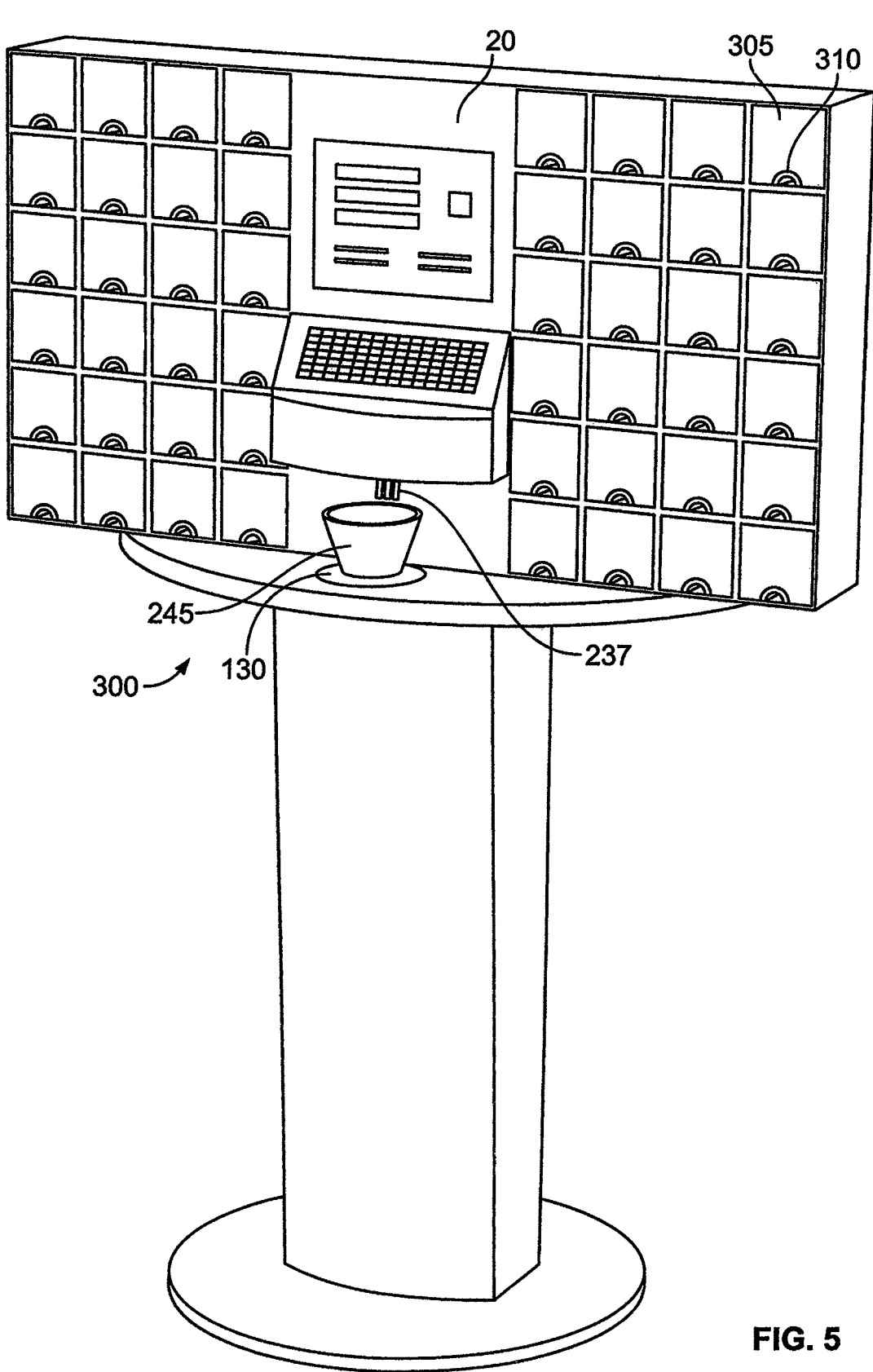
FIG. 5 is a perspective view of one embodiment of the system designed to control a manual process for mixing components, illustrating the use of receptacles with a change in the LED indicators.
Figure 6:
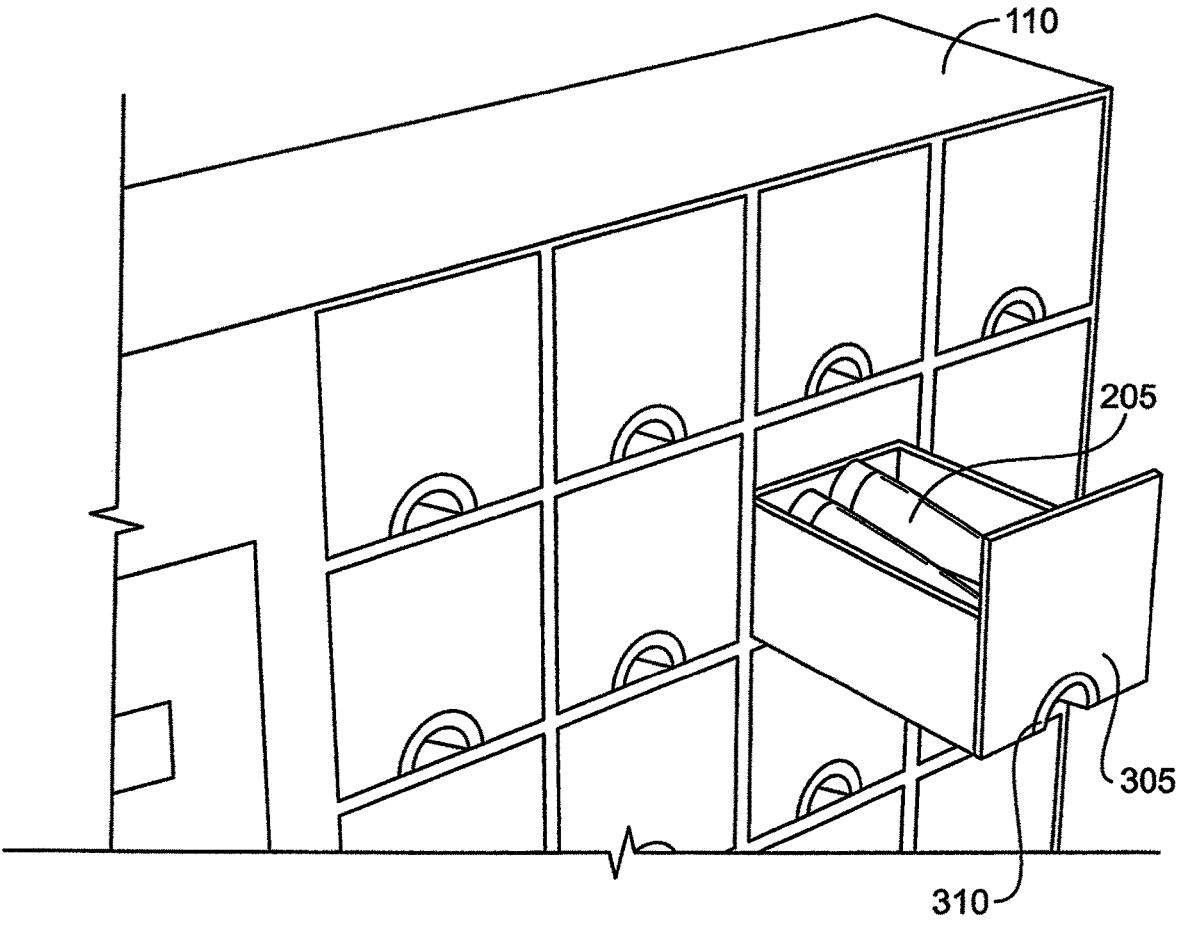
FIG. 6 is an enlarged view of a receptacle from FIG. 5.

The systems can be designed in various manners. For example as illustrated in FIG. 1, the system is a counter-top model, while FIG. 3 shows a freestanding model 270 with a stand 275 so the system can stand on the floor. FIG. 4 shows a corner top model 280 with storage receptacle areas 285 that have curved sections 290. In FIGS. 5-6 an alternative system 300 is shown with receptacles 305 that include LED indicators 310 on the bottom of each receptacle (as opposed to in the center, shown in the previous embodiments). In addition, in each embodiment the storage receptacles can be an optional piece to the system.

Figure 7:
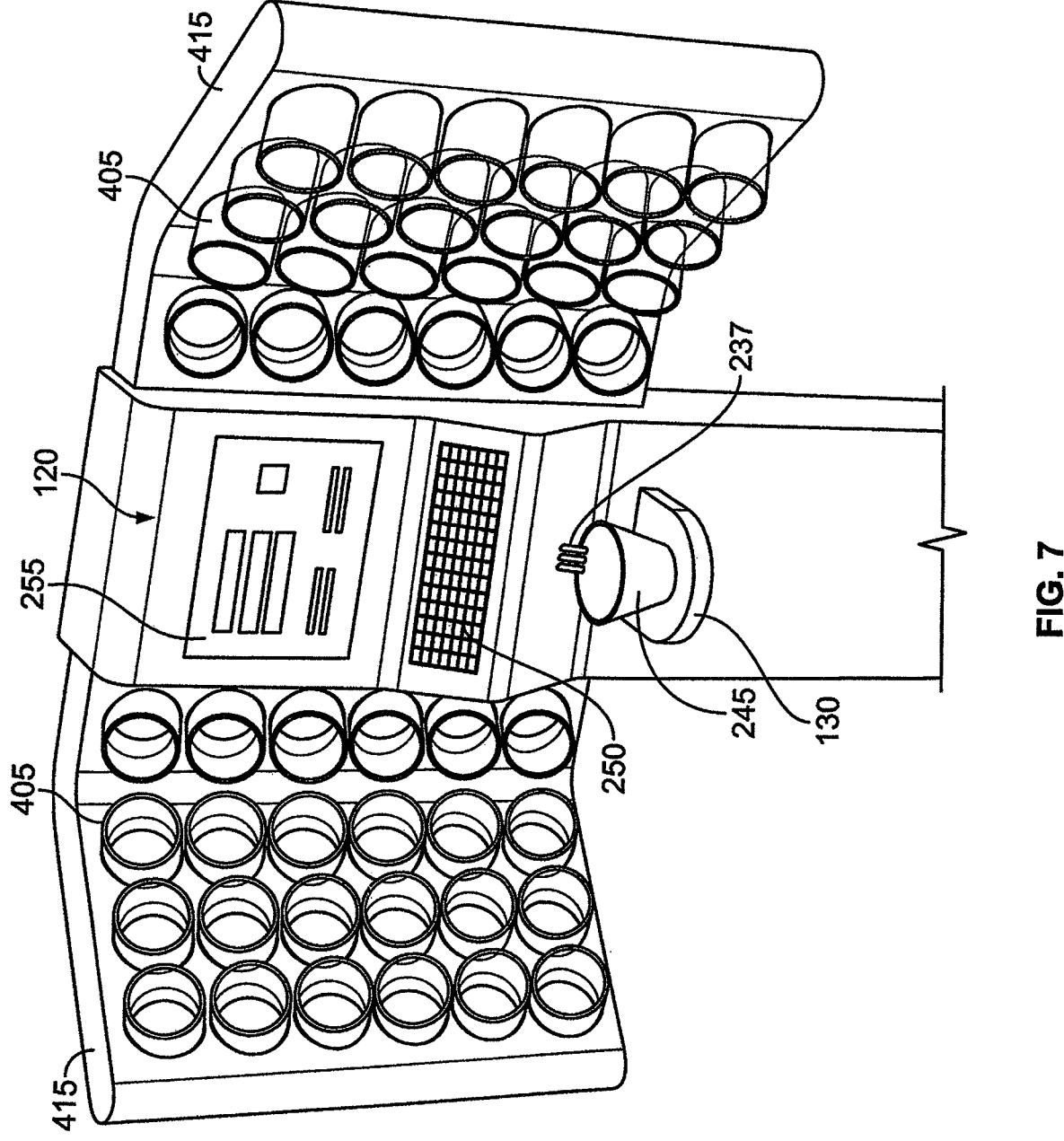
FIG. 7 is a perspective view of one embodiment of the system designed to control a manual process for mixing components, illustrating the use of slotted tubes as opposed to receptacles.
Figure 8:
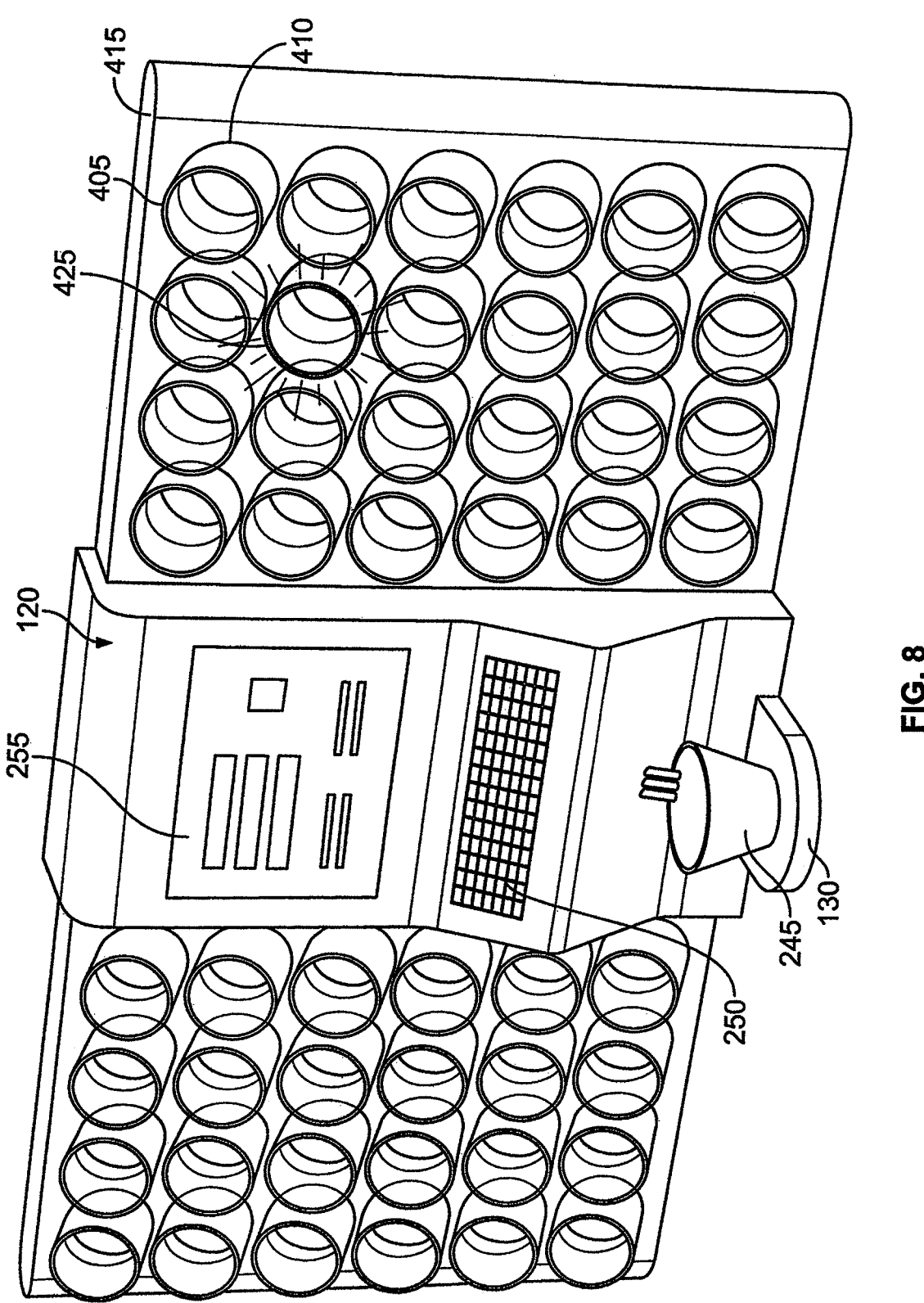
FIG. 8 is a perspective view of one embodiment of the system designed to control a manual process for mixing components, illustrating the use of slotted tubes as opposed to receptacles.
Figure 9:
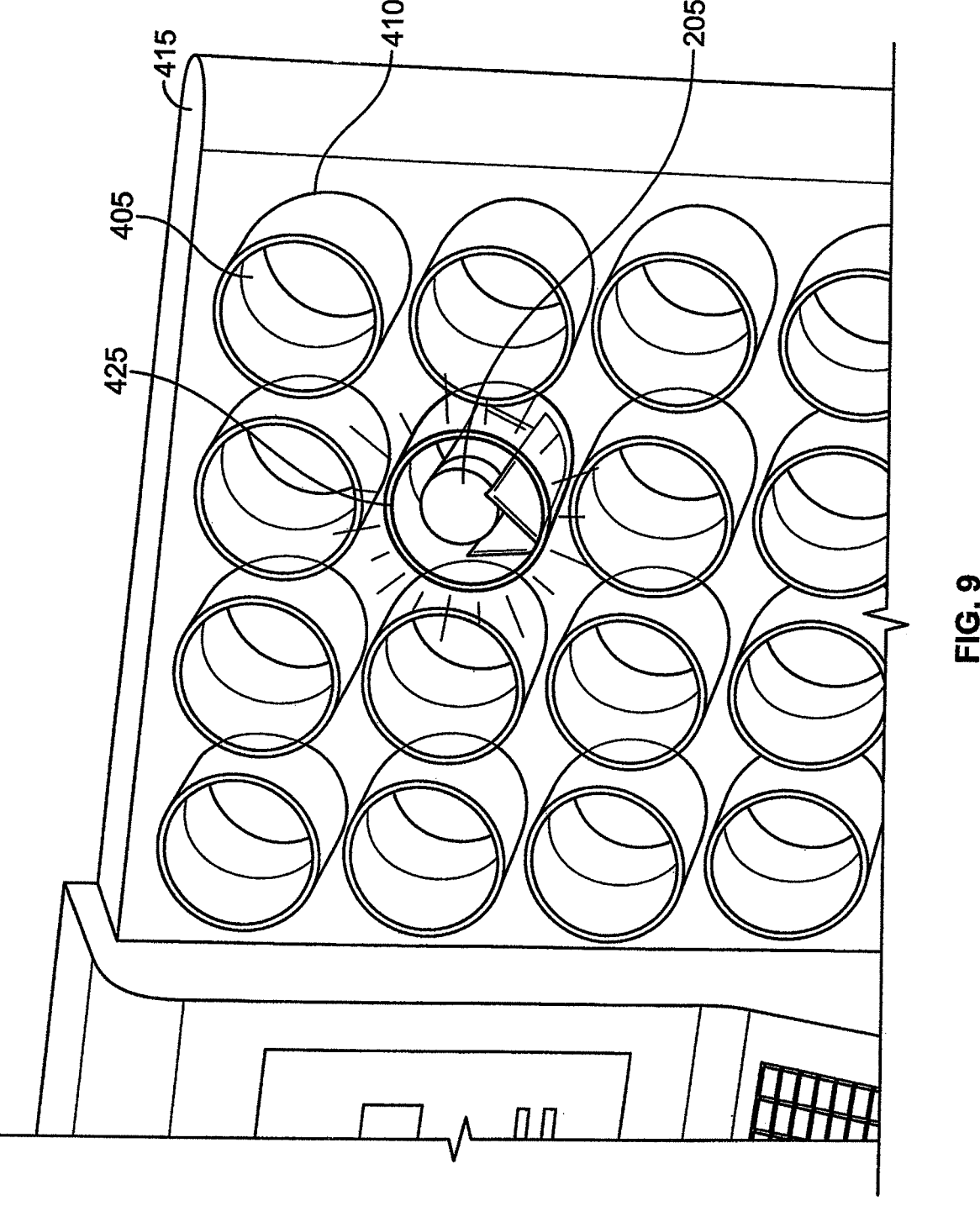
FIG. 9 is an enlarged view of the slotted tubes from FIG. 7 or FIG. 8.

In FIGS. 7-9, a system 400 is shown that includes the same components and functionality as the previous embodiments, except the receptacles are replaced with opened drawer structures 405 that are secured into openings 410 on the side storage areas 415. The ends 420 of the tubes would include an LED indicator 425 controlled by the control system 220.

The present embodiment has one or more of the following benefits over prior art systems: it eliminates mixing or blending errors; the system ensures accuracy; the simple, manual controlled process produces perfect results regardless of skill level or experience; the system maintains customer histories, so customer formulations can be precisely repeated time after time; using the system, even custom formulation is recorded for future reference; the system makes control independent of the operator, so should a colorist leave a salon, the exact color can be recreated; giving the salon greater control over its individual requests; the scale coupled to the control software can correct for over-dispensed ingredients preventing wasted materials and off-shades; the system is compatible with current manufacturing processes and product packaging; the system brings tidiness and organization to an otherwise very messy process and would save counter space; and the control software can track material usage to help eliminate shrinkage and provides a tool to estimate future needs.

Figure 11:
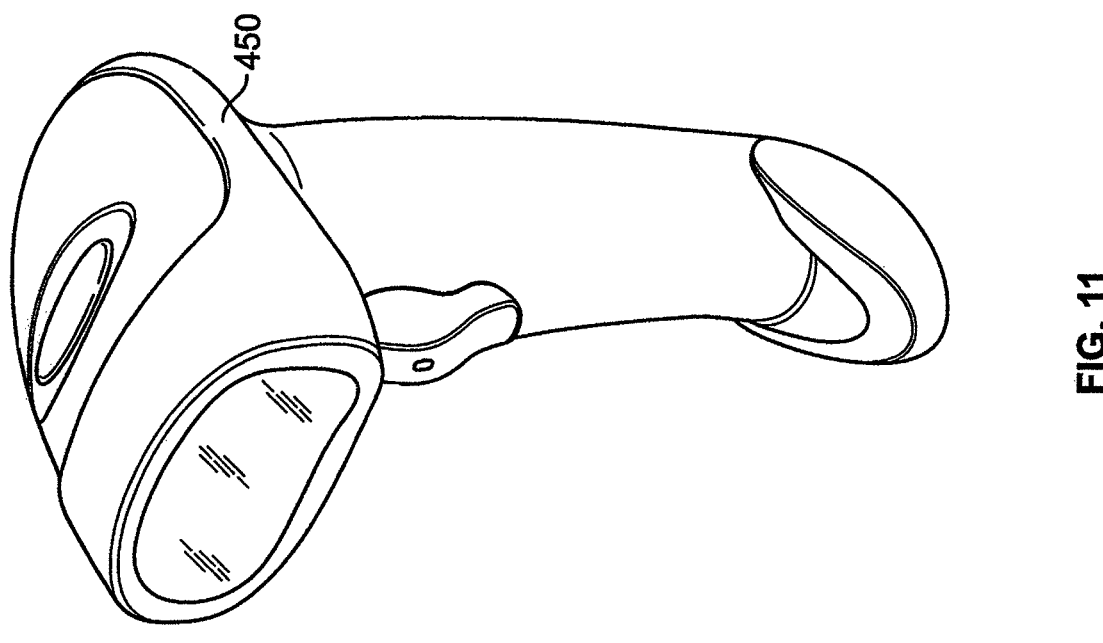
FIG. 11 is a perspective view of a barcode scanner used in one or more of the system embodiments.
Figure 10:
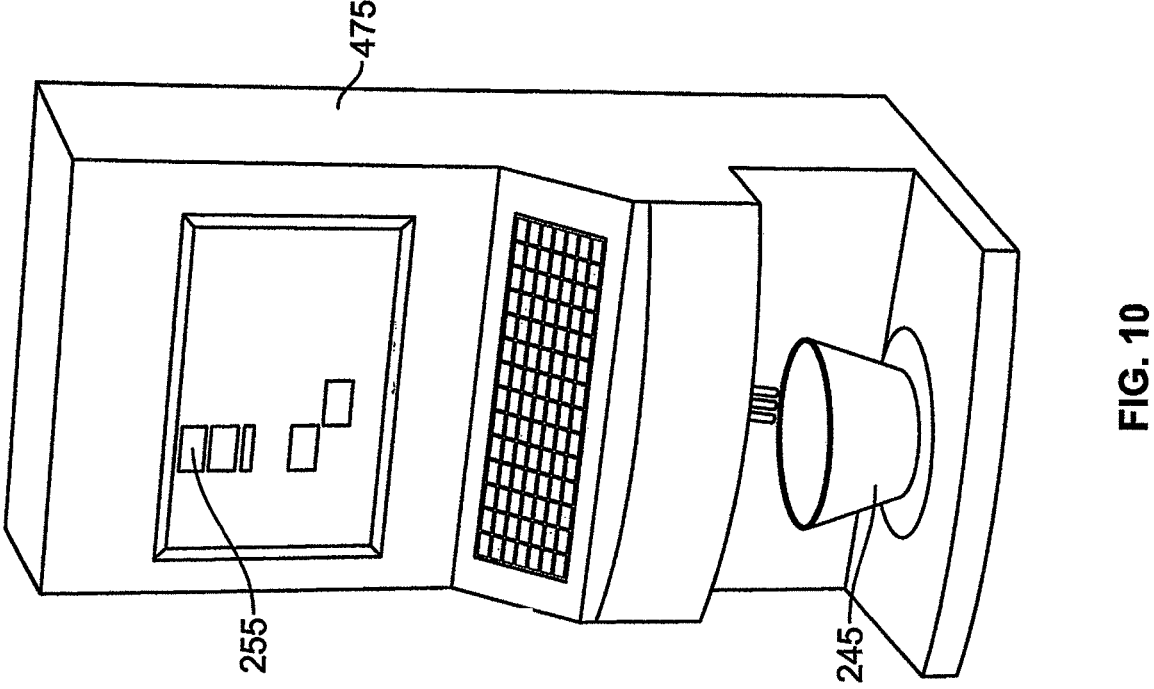
FIG. 10 is a perspective view of one embodiment of the system designed to control a manual process for mixing components.
Figure 12:
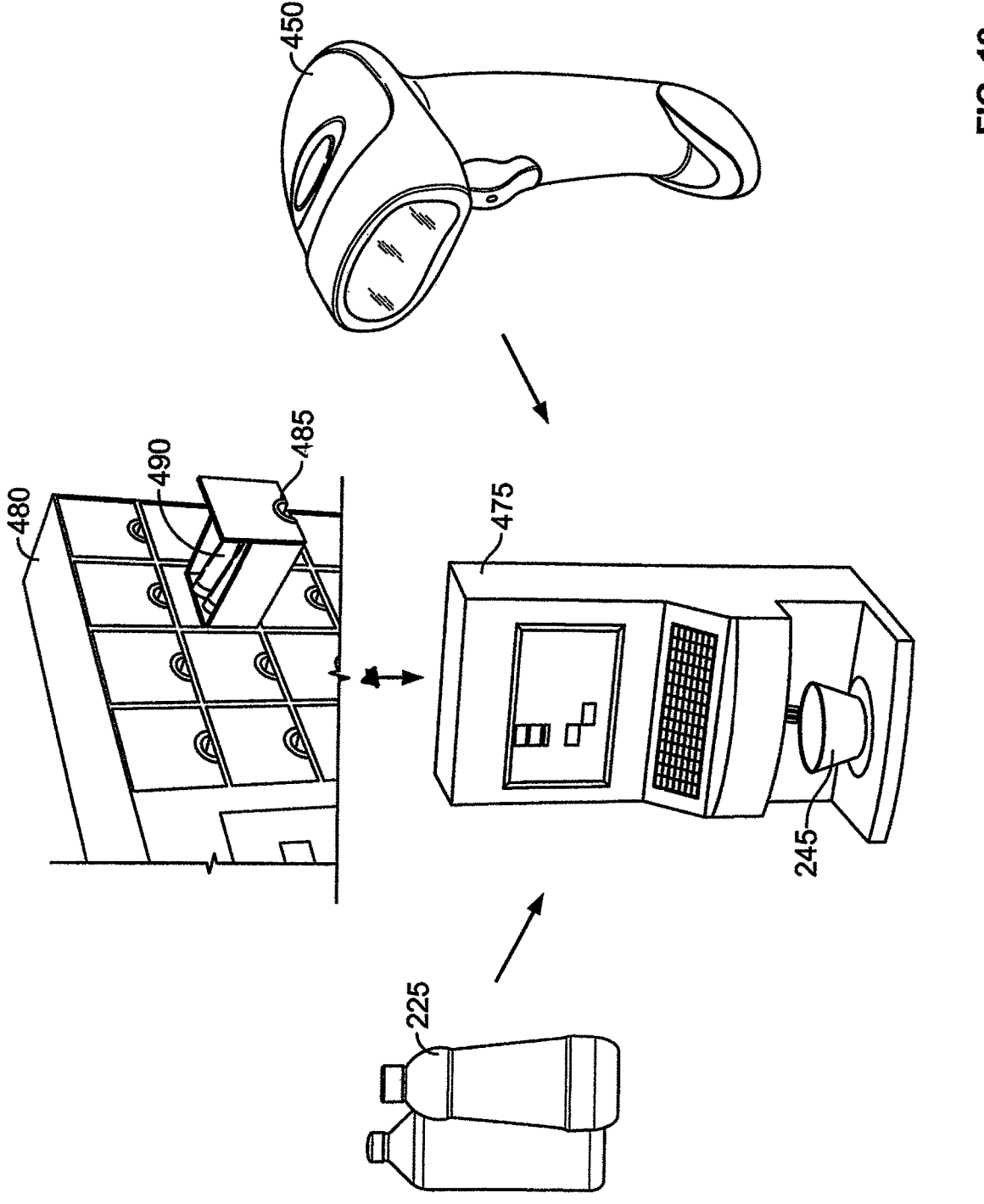
FIG. 12 is a perspective view of one embodiment of the system designed to control a manual process for mixing components, illustrating a modular system with at least detached storage receptacles.

Referring now to FIGS. 10 through 12, in another aspect of the blending system, the control system would control the display to indicate a remaining weight required during the manual dispensing of the component. As the component is being added to the bowl 245, the display 255 indicates how much of the component needs to be added, by counting up or down to the target weight. Various kinds of analog indicators can be displayed to more effectively communicate the remaining material to be added. When the operator presses "next" on the system, the system would illuminate the next LED and also recalibrate the scale to zero and indicate to the operator how much of the next component needs to be added. Again, as the operator adds the next component, the system leads the operator through the blending process.

An optional barcode scanner 450 could be provided to verify the correct component SKU prior to use. The barcode scanner may also help keep track of the product and make sure the operator is using the correct product. For example, if the system identifies a particular product in a particular receptacle, the operator after retrieving the product would scan the product. The system would check to make sure the actual product scanned is the correct product identified by the system for use. Other types of scanning equipment may be employed such as RFID scanners.

In other aspects of the blending system, the system 475 may have separate receptacle storage areas 480, shown in FIG. 12, as a more modular system setup. The separate storage areas 480 and the main console area 475 would communicate either wirelessly or through wired connections. This would allow the main console 475 to communicate and direct the receptacle storage areas 480 to turn on and off the LED or other indicators 485, in order to illustrate which receptacle to retrieve the required components 490; and keep track of the quantities of components for re-ordering purposes. In addition, it would thus be possible to just use the main console without the storage receptacles.

In another embodiment of the blending system, the system 100 may be used in conjunction with a management software package. The elements of a basic management package would be shared by the system application including the ability to access and share customer data, customer history, and inventory data.

Most available management software packages maintain basic customer data such as name, telephone number, email address, etc. History data would include service date, services provided, user, notes and perhaps photographs. Many of the management software packages use text fields for notes, which is the only provision to store recipe data. The system will maintain a separate dispense history file, but will be capable of sharing this information with the management software packages for inclusion with customer history records. In addition; as many management software packages have inventory modules, product usage would need to be reported.

Referring now generally to FIGS. 13 and 14, one or more of the present embodiments will be referenced in the given flow diagrams to illustrate various inputs and outputs from a given system.

In use with one or more of the present embodiments and an available management software, operation of the system could typically follow in the following steps:

(a) an operator enters the customer name or other identifying characteristic (i.e., telephone number, etc.) into the control system, BOX 500;

(b) the control system would display the customer's history information; However, if this is a new customer (BOX 505), the control system would permit the operator to create a new history file (BOX 510);

(c) the operator then selects desired components, BOX 515, from an available chart or palette which is stored within a formulation database (BOX 520) (if the management software packages has a chart or palette database, the control system would be linked to it so the chart or palette could be read and interpreted by the control system;

(d) the system then prompts for the required amount or size of finished component;

(e) the system may then prompt for an activator strength;

(f) the stock color recipe is mathematically scaled for the desired batch size and the selected activator strength is displayed, BOX 525;

(g) the operator is prompted to place an empty mixing bowl on the scale;

The system will compare actual weight of the bowl against a target range value—this range of values is to be user definable. If the set range is 0 to 0, the no validation will occur. The control system will contain a maximum weight for the mixing bowl to allow sufficient fluid capacity and stay below the maximum scale capacity. For example, if the maximum scale capacity is 1,200 grams, and the batch size calls for 600 grams of dye components, then the maximum possible weight of the mixing bowl would be 600 grams. However, to allow for batch correction capability, the calculation should assume a 50% dye component weight variation (i.e., of 600 grams, plus variation=900 grams leaving a maximum bowl weight of 300 grams) Enforcing a maximum bowl value ensures sufficient scale capacity for color mixing.

(h) if the correct bowl weight value is achieved, the control system will prompt for the first component, BOX 530.

If no validation is to be made, or the value is outside of the range, a control system will cause a message to be displayed, and the operator will be prompted to proceed or cancel. If the bowl is above the maximum allowable, a caution message should be displayed.

(i) as the first component is prompted, an LED adjacent to the corresponding receptacle/drawer is illuminated so the operator can quickly locate the desired ingredient (for systems with optional storage system);

(j) if door locks have been included, an unlocking signal is provided to the corresponding solenoid. For reference, this optional feature would only allow drawers which were un-locked by the system to be opened. This provides two features: (a) prevent inventory theft and/or (b) force the operator to use the system—operators can't get inventory otherwise.

This ensures that all transactions are recorded and properly accounted for in the system's history files. Similarly, the system could actually open and or close the receptacles; or lock and unlock the drawers/receptacles with appropriate hardware and mechanics, all of which are known;

(k) the weight of the mixing bowl is internally recorded for use in measurement calculation, and a digital value of 0.0 grams is displayed to indicate the amount of ingredient 1 that has been added;

(l) the operator manually adds the amount indicated on the display panel, while the scale monitors exactly how much has been added and provides user feedback via the analog and/or digital indicators, BOX 535

(m) a color-coded analog bar-graph scale is displayed that shows the progress of the first component being added. As material is added, the analog bar-graph scale changes color from green to yellow, to orange and finally to red. Green being the starting point, yellow to indicate the operator is nearing the target weight, orange is very close, and red meaning stop;

(n) the control system will compare the actual dispensed amount to establish accuracy standards. When the calculated minimum amount of an ingredient has been reached, the ingredient will be considered complete and the analog display will turn red. If the volume added is greater than the maximum allowed value, the user will be prompted to "accept", or "correct" the batch. If "correct" is selected, the total batch volume will be recalculated based on the amount of the discrepancy, BOX 540. All corresponding weights will be increased accordingly. If other ingredients had been added to the batch prior to the over-dispense, the system will automatically prompt the operator to add additional amounts of these ingredients as required. When the correct add has been completed, the operator is prompted to return the component to the storage receptacle/drawer (if applicable) and to close the drawer in order to continue.

(o) the control system would then prompt the operator to the second component by illuminating the LED adjacent to the corresponding receptacle/drawer. Similarly, if door locks have been included, an unlocking signal is provided to the corresponding solenoid.

(p) the current weight of the mixing bowl is internally recorded for use in measurement calculation, and a digital value of 0.0 grams is displayed to indicate the amount of ingredient 2 that has been added. The operator repeats steps (i) through (n) for all manually weighed ingredients (BOX 545).

(q) if the system is equipped with "automatic additive dispensing" the control system will automatically dispense the desired activator or base ingredients. The dispensing function is performed gravimetrically (using the scale). If more than one ingredient is to be added, they will be dispensed sequentially. Without automatic dispensing, the system would simply prompt the user to add the appropriate activator or base ingredient and indicate the required amount as indicated in the previous steps.

(r) when all ingredients have been added, the operator will be prompted to remove the mixing bowl (Box 550); a database record is created with the precise amount of each ingredient dispensed and the record is stored in the history file (Box 555). A record containing the color name, amount, time and date is created and can be passed to the management software package in order for the management software package to attach the information as a note to the custom record file.

(s) in addition, a record of the amount of each ingredient used will be maintained in the control system for inventory tracking purposes. The operator will have the ability to query the control system to determine the amount of each ingredient for a given time period. The system should also be capable of passing usage values to the management software package if necessary.

In instances where the operator would be creating a new mixture for a customer (FIG. 14), the operator would have the option to create a new file (BOX 560), which would be selected to start the appropriate software section of the control system. The operation would follow similar steps to the above, except instead of notifying the operator which component to use, the control system would prompt the operator to select the first ingredient from an on-screen list of available components, such as listing available colors and/or additives (BOX 565). After the selection is made, an LED or other indicator adjacent to the corresponding receptacle is illuminated to provide the operator with an identification of where the component can be located (BOX 570). If door/drawer locks have been included, an unlocking signal is provided to the corresponding solenoid. After which locking signals, and even, if desired, opening and closing signals, could be easily added.

The tare weight of the mixing bowl is internally recorded for use in measurement calculation, and a digital value of 0.0 grams is displayed to indicate the amount of the ingredient that has been added. The operator manually adds the desired amount of the first ingredient, while the corresponding reference weight is displayed (BOX 575). When the addition is complete, the user selects "next." The operator is prompted to return the component to the storage receptacle (if applicable) and to "Press any key to Continue." (BOX 580). If door/drawer locks, the system may even automatically lock the drawer when the component is returned and the drawer is closed or it may be manually closed by the operator before the operator is permitted to proceed. The display would show the name of the first ingredient, and the amount added to the formula. The operator is prompted to select the second ingredient from an on-screen list (BOX 585). If door/drawer locks have been included, an unlocking signal is provided to the corresponding solenoid. The tare weight of the mixing bowl is internally recorded for use in measurement calculation, and a digital value of 0.0 grams is displayed to indicate the amount of ingredient 2 that has been added. The operator manually adds the desired amount of the second ingredient, while the corresponding reference weight is displayed. When the addition is complete, the user selects "next." The display shows the names of the first two ingredients, and the amount of each added to the formula. This would continue until all of the required ingredients have been added. When the last ingredient has been added, the operator selects "done" (BOX 590). Upon completion, a total batch volume will be calculated based on the specific gravity of the individual ingredients. This value is stored for future reference to permit batch size scaling of the recipe. A database record is created with the precise amount of each ingredient dispensed and is stored in the history file within the control system (BOX 595). A text record containing the name, amount, time and date is created and passed to the management software package to be attached as a note to the custom record file. A record of the amount of each ingredient used will be maintained in the control system for inventory tracking purposes. A simple query should be available to determine the amount of each ingredient for a given time period.

In addition, raw material inventory management functionality with and without the use of optional barcode equipment may be provided by one or more of the present embodiments. Barcode scanning devices simplify inventory management functions. By using an attached barcode scanner, mixing ingredients can be easily identified for inventory tracking purposes. The functions could be two-fold. One, an on-hand inventory could be established by scanning all available product inventory items. When new shipments are received, they too could be scanned, thereby easily adding them to the on-hand inventory. Secondly, when systems are equipped with the optional storage receptacles, scanning the component could also be used to illuminate the appropriate lamp, or unlock the corresponding door. This functionality will help to ensure that the materials are properly stored and further minimizes the potential for selecting the wrong material during subsequent mixing operations.

In the case of a salon, the system may also track operators' use of the system, which allows cost reporting by employee. It would also accurately track third-party billing for "chair rental" environments. In many salons, some of the stylists are not direct employees, but rather rent a chair from the salon owner. Sometimes a stylist renting a chair provides their own materials, such as hair color, and some utilize materials from the salon. Since the system would know the exact amount of each ingredient included in a blend, it has the ability to establish the exact material cost for each batch. This data can be used to better understand service costs and can also be used to provide billing data for "rental chair" staff.

In additional embodiments, the system can be provided with the ability to help eliminate waste. In salons, the user or stylists typically mix more than the required amount of components for their clients. The reasons are twofold: (a) current volumetric measurement systems do not allow for scaled-down batches, and (b) it is difficult to estimate the actual amount of components or color required and they do not want to run out mid-application. One improved feature would allow the user or stylist to return the mixing bowl to the scale after finishing with the client. Since the weight of the bowl at the end of the mixing step was known when the mixture was produced, the system can subtract the returned bowl weight from the final weight. It is then possible for the system to know the amount of mixture actually used by the user or stylist during application. The client's master formula can then be adjusted to the actual amount used and if necessary an additional amount can be added for a defined safely factor, such as a 5% or 10%. On subsequent client visits, the re-scaled master formula, combined with the precision measurement capabilities of the system virtually eliminates product waste.

In one embodiment, there is provided a system for recalculating a formula previously used in preparing a mixture made from adding at least two components. The system includes a control apparatus and a scale. The control apparatus has a memory (permanent and/or temporary), input controls, and a display, the memory being used to store a mixture formulated from mixing at least two components. The scale is in communication with the control apparatus. The control apparatus monitors a weight on the scale, such that a final weight of the mixture previously prepared from mixing at least two components is stored on the memory. In this embodiment, when an end weight of the mixture, defined to be the final weight of the mixture previously prepared minus an amount used by a user, is positioned on the scale and when the control apparatus receives a recalculation signal, the control apparatus calculates the amount used, recalculates the mixture based on the amount used, and stores a new mixture for subsequent use. This helps reduce and eliminate extra waste.

This system embodiment can further be defined as a method for recalculating a formula. The method would provide a first step of providing a control apparatus having at least a memory, input controls, and a display, wherein the memory stores a mixture formulated from mixing at least two components. The next step would be providing a scale in communication with the control apparatus, such that the method stores on the memory a final weight of a mixture previously prepared from mixing at least two components. After use, the user would weigh on the scale an end weight of the mixture. The end weight of the mixture is defined as the final weight of the mixture previously prepared minus an amount used by a user. Finally, the method recalculates the formula of the mixture based on the end weight of the mixture against the final weight of the mixture and stores the recalculated formula on the memory of the control apparatus.

In an additional embodiment, there is provided a system for preparing a mixture. The system includes a control apparatus having at least a memory, input controls, and a display. The memory has the capacity to store at least one mixture formulated from mixing of one or more components based on recommended formulated amounts of the one or more components. In communication with the control apparatus is a scale monitored by the control apparatus for changes of a weight on the scale. The control apparatus, upon receiving an input for a creation of a mixture, will display a formulation of the mixture indicating the component(s) and amount(s) needed to create the mixture, and the control apparatus will further monitor changes in the weight of the scale, wherein the control apparatus will adjust the formulation when a weight of a component added to the mixture is different than the recommended formulated amount.

In yet another embodiment of the blending system, there is provided a system for manual storage and mixing components to provide an operator the ability to create a mixture. The system is defined to include a plurality of storage receptacles, each receptacle holding at least one component and each receptacle in communication with a control apparatus. The control apparatus has at least a memory, input controls, and a display. The system improvement includes: (a) the memory having the capacity to store and/or storing at least one formulated mixture, which lists the component(s) and amount(s) thereof; (b) the control apparatus upon receiving an input for a creation of a mixture displays the formulated mixture indicating the component(s) and amount(s) needed to create the mixture; and (c) an electronic locking mechanism positioned at each storage receptacle, wherein the control apparatus upon receiving the input for the creation of the mixture is capable of sending a signal to the electronic locking mechanism to lock and/or unlock one or more receptacles relative to the component(s) being held therein to create the mixture.

Alternatively, each receptacle may have an opening position and a closing position. In this instance, each receptacle having the electronic mechanism positioned at each storage receptacle is set to open and/or close the storage receptacles. Therefore when the control apparatus receives the input for the creation of the mixture it is capable of sending a signal to the electronic locking mechanism to open and/or close one or more receptacles relative to the component(s) being held therein to create the mixture.

Figure 15:
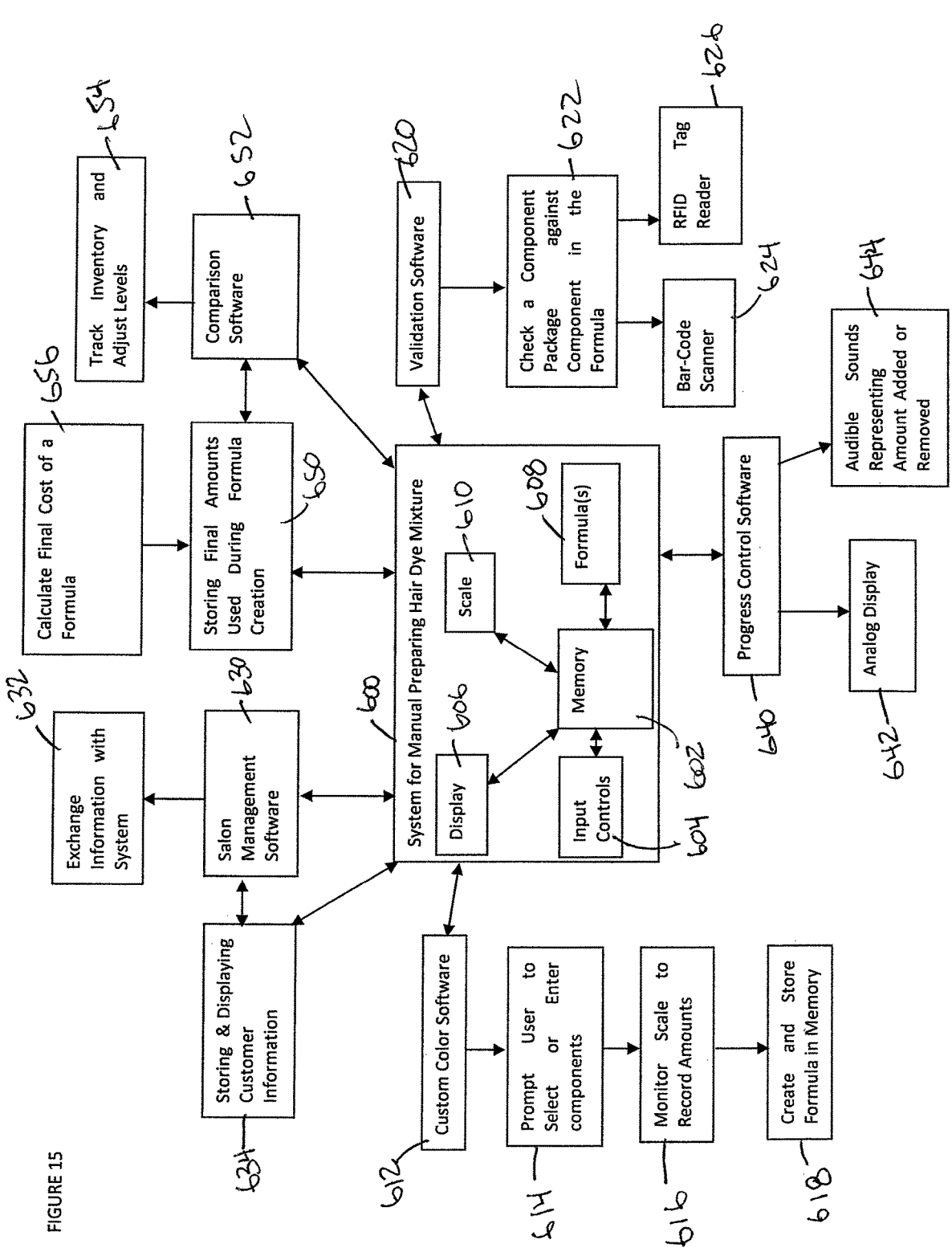
FIG. 15 is a system illustration showing various software components and their relationship to the system.

Referring now to FIG. 15, there is provided in various embodiments a system 600 for manually preparing a hair dye mixture. The system generally includes a control system having one or more of the following elements: (a) a memory 602, (b) input controls 604, and/or (c) a display 606. The system further includes at least one formula 608 stored in the memory 602. The formula defines instructions of one or more colorants and/or dye blending materials and amounts recommended for manually recreating a hair dye mixture.

The system also includes a scale 610 in communication (wireless or wired) with the control system.

The system in a first aspect of the various embodiments includes software 612 to permit the user to create a custom color. The custom color software 612 upon receiving a manual input from the input control for a creation of a hair dye custom color mixture, will prompt a user to select or enter one or more colorants and/or dye blending materials 614 and monitors the scale for an amount corresponding to said one or more colorants and/or dye blending materials 616. The custom color software will create and store 618 a hair dye mixture formula based upon the selected or entered colorants and/or dye blending materials and the corresponding amounts that were placed on the scale. Various other aspects and uses of the custom color can be incorporated with the formula adjusting software used to adjust the formula of the hair dye mixture when a weight of a colorant or dye blending material being manually added to the scale is different than the amount recommended in the formula.

In a second aspect of the various embodiments, the system includes validation software 520 to check a hair dye component package against the hair dye component(s) in the formula to ensure and validate a user is accurately manually recreating the hair dye mixture 622. The validation software may be used in connection with a barcode scanner 624 to scan the barcodes positioned on the component package or used in connection with an RFID reader 626 to read information for an RFID tag positioned on the component package.

In a third aspect of the various embodiments, the system includes salon management software 630 in communication with to the control system to exchange information on customers and formulas of hair dye mixtures associated to said customers 632. In this aspect the system could have the input control and the display in communication with the control system and software for displaying the instructions on said display in response to a manual input from the input controls and monitoring software to monitor a weight on the scale 634. The monitoring software aids in monitoring changes in the weight on the scale such that the control system is able to calculate a difference between a recommended formulated amount of a colorant or dye blending material and an actual amount of the colorant or dye blending material added to the scale. This difference can then be measured down to a zeroed amount, with an adjustment for the weight of a receptacle, such that the control system is able to indicate how much additional colorant or dye blending material is needed to be added to the scale to reach the recommended formulated amount of the colorant.

In a fourth aspect of the various embodiments, the system includes progress control software 640 to indicate one or more of the colorant(s) and/or dye blending material(s) from the hair dye mixture being added to or removed from the scale. The progress control software can include an analog display representation 642 of one or more of the colorant(s) and/or dye blending material(s) from the hair dye mixture, and the software capable of changing the analog representation to indicate an amount being added to or removed from the scale. The analog representation can be a graph, such as a bar-graph, circular, pictorial, or line graph and can be color coded or black/white, or gradation; alternatively it could use sound or other types of representations. The process control software can also include the ability to replay audible sounds 644 representing one or more of the colorant(s) and/or dye blending materials from the hair dye mixture, and includes software to replay audible sounds to indicate an amount being added to or removed from the scale.

In a fifth aspect of the various embodiments, the system includes at least one set of customer information stored in said memory, such that the customer information 634 is associated with the at least one formula. The system further includes software to update the at least one set of customer information. And the system can be linked to the salon management software to exchange customer information.

In a sixth aspect of the various embodiments, the system includes software to store in the memory a final amount used of each of the one or more colorants and/or dye blending materials defined by the formula 650. In this aspect the system may further include comparison software 652 to track the inventory 654 of the one or more colorants and/or dye blending materials by reducing a current inventory level of each of the one or more colorants and/or dye blending materials by the final amount used of each of the one or more colorants and/or dye blending materials. In addition, the comparison software can be used to track inventory levels and reduce the current inventory level by an amount used during the manual preparation of a hair dye mixture, and/or increase the current inventory level by an amount received during a new shipment and/or to the actual purchase orders. Yet still, the amount reduced can further be allowed to track if a product is thrown out, spoiled, missing or otherwise needs to be reduced to ensure proper inventory levels. Yet as a further consideration, the amount used during the manual preparation of the hair dye mixture is determined by the amount on the scale. This could also be used to compare different stylist's performances.

In a seventh aspect of the various embodiments, the control system has stored in said memory current inventory levels for at least one or more colorants and/or dye blending materials and the costs associated with each one or more colorants and/or dye blending materials. The control system further includes software to calculate the final cost 656 of a hair dye mixture by monitoring the manual preparation of the hair dye mixture including monitoring the scale for a final amount used of each of the colorants and/or dye blending materials defined by the formula, allocate a cost of each of used during the manual preparation and calculate the final cost by adding the individual costs. Once a final usage and/or cost is determined, color usage and/or cost can be reported by a control system's reporting software. The reporting software will further be capable of creating reports for specified time periods on the material usage and cost based by stylist, client, salon (when the software are linked to other salons), manufacturer of a particular product or product line, and/or chair or booth renter. The reporting software will further include components for determining average costs per client per treatment.

From the foregoing and as mentioned above, it will be observed that numerous variations and modifications may be effected without departing from the spirit and scope of the novel concept of the blending system. It is to be understood that no limitation with respect to the specific methods and apparatus illustrated herein is intended or should be inferred. It is, of course, intended to cover all such modifications.

What is claimed:

1. A method for preparing a hair dye mixture, the system comprising:

accessing a control system having at least a processor, a computer-readable memory, and a display, wherein the memory contains software configured to receive a formula defining instructions for blending a hair dye mixture using one or more colorants and/or dye blending materials and amounts recommended for the hair dye mixture;

enabling selection input, via a user control system, of one or more of a stored hair dye mixture from a customer history, a stored dye color from the customer history, a finished mixture from an available list of known hair dye mixtures, or components for a new hair dye formula;

preparing an amount of a hair dye mixture using the selection input;

determining an end weight of the hair dye mixture after a user has used the hair dye mixture; and calculating a revised amount of the hair dye mixture by subtracting the end weight of the hair dye mixture from the prepared amount of the hair dye mixture.

2. The method of claim 1, wherein the representation is a graph.

3. The system of claim 1, wherein the representation is one of the following: a bar-graph, a line graph, a circular graph, and a pictorial graph, and the representation is either color coded or gradation coded.

4. The method of claim 1, further comprising: tracking inventory of the one or more colorants and/or dye blending materials by reducing a current inventory level of each of the one or more colorants and/or dye blending materials by the final amount used of each of the one or more colorants and/or dye blending materials.

5. The method of claim 1, further comprising:

storing in the computer-readable memory a final amount used of each of the one or more colorants and/or dye blending materials defined by the formula.

6. The method of claim 5, wherein the formula is associated with a customer data file stored in the memory.

7. The method of claim 1, further comprising:

monitoring a final amount used of each of the one or more colorants and/or dye blending materials defined by the formula; and determining a cost of each of the one or more colorants and/or dye blending materials used during preparation, wherein a final cost of the hair dye mixture is calculated.

8. The method of claim 7, further comprising: storing in the computer-readable memory the final amount used and the final cost of the colorants and/or dye blending materials used in the preparation of the hair dye mixture.

9. The method of claim 7, further comprising: storing information in the memory on a customer and a stylist corresponding to the final amount used and the final cost of the colorants and/or dye blending materials used in the preparation of the hair dye mixture.

10. The method of claim 7, further comprising: creating a report based on the final amount used of the colorants and/or dye blending materials for a specified time period.

11. The method of claim 7, further comprising: creating a report based on the final cost of the colorants and/or dye blending materials for a specified time period.

12. The method of claim 7, further comprising: creating a report based on the customer and one or more or an associated total use, a total cost of the colorants, or a total cost of the dye blending materials for a specified time period.

13. The method of claim 7, further comprising: creating a report based on the stylist and one or more or an associated total use, a total cost of the colorants, or a total cost of the dye blending materials for a specified time period.

14. The method of claim 7, further comprising:

storing tracking software in the computer-readable memory that is executed by the control system, the software configured to adjust inventory levels of the one or more colorants and/or dye blending materials by decreasing the current inventory level by an amount used during the preparation of a hair dye mixture.

15. The method of claim 14, further comprising: adjusting, using the tracking software, inventory levels of the one or more colorants and/or dye blending materials by increasing the current inventory levels by an amount received during a new shipment.

16. The method of claim 14, further comprising: comparing, using the tracking software, inventory levels of the one or more colorants and/or dye blending materials received during a new shipment against a purchase order.

17. The method of claim 14, further comprising: adjusting, using the tracking software, inventory levels by decreasing the current inventory level by an amount lost or spoiled.

* * * * *